United States Patent
Wu et al.

(10) Patent No.: US 11,003,578 B2
(45) Date of Patent: May 11, 2021

(54) METHOD AND SYSTEM FOR PARALLEL MARK PROCESSING

(71) Applicant: BANMA ZHIXING NETWORK (HONGKONG) CO., LIMITED, Kowloon (HK)

(72) Inventors: Zhefeng Wu, Hangzhou (CN); Jianghua Yang, Hangzhou (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 30 days.

(21) Appl. No.: 16/144,624

(22) Filed: Sep. 27, 2018

(65) Prior Publication Data

US 2019/0129843 A1     May 2, 2019

Related U.S. Application Data

(63) Continuation-in-part of application No. PCT/CN2017/077446, filed on Mar. 21, 2017.

(51) Int. Cl.
    *G06F 12/02*     (2006.01)
    *G06F 9/455*     (2018.01)
    *G06F 9/48*      (2006.01)

(52) U.S. Cl.
CPC ...... *G06F 12/0253* (2013.01); *G06F 9/45558* (2013.01); *G06F 9/4881* (2013.01); *G06F 12/0261* (2013.01); *G06F 12/0269* (2013.01); *G06F 12/0276* (2013.01);
(Continued)

(58) Field of Classification Search
CPC ............. G06F 12/0253; G06F 12/0261; G06F 12/0269; G06F 12/0276
See application file for complete search history.

(56) References Cited

U.S. PATENT DOCUMENTS

| 5,920,876 A | 7/1999 | Ungar |
| 6,209,066 B1* | 3/2001 | Holzle ................. G06F 9/4862 711/153 |
| 6,826,583 B1 | 11/2004 | Flood |

(Continued)

FOREIGN PATENT DOCUMENTS

| CN | 102023891 | 4/2011 |
| CN | 102722415 | 10/2012 |

OTHER PUBLICATIONS

ISR of associated PCT CN2017/077446 (Year: 2017).*
(Continued)

*Primary Examiner* — Paul M Knight
(74) *Attorney, Agent, or Firm* — Van Pelt, Yi & James LLP

(57) ABSTRACT

Parallel mark processing is disclosed including traversing first objects in a virtual machine heap based on correspondences between memory blocks in the virtual machine heap and N marking threads, pushing a first pointer of a first object into a private stack of a marking thread corresponding to a memory block, the first object being located in the memory block, performing first mark processing of the first object based on a push-in condition of the first pointer, and after traversal of the first objects has been completed, launching the N marking threads to cause the N marking threads to synchronously perform mark processing used in garbage collection based on push-in conditions of first pointers in respective private stacks of the first pointers.

7 Claims, 30 Drawing Sheets

(52) U.S. Cl.
CPC ............. *G06F 2009/45583* (2013.01); *G06F 2212/1024* (2013.01); *G06F 2212/1044* (2013.01); *G06F 2212/657* (2013.01)

(56) References Cited

U.S. PATENT DOCUMENTS

| | | | |
|---|---|---|---|
| 7,293,051 B1* | 11/2007 | Printezis | G06F 12/0269 707/814 |
| 9,501,331 B2* | 11/2016 | Li | G06F 9/5027 |
| 2009/0248766 A1 | 10/2009 | Garthwaite | |
| 2010/0191928 A1* | 7/2010 | Hawblitzel | G06F 12/0253 711/166 |
| 2015/0058381 A1 | 2/2015 | Wilhelmsson | |
| 2016/0044092 A1* | 2/2016 | Weber | H04L 29/08072 709/201 |
| 2016/0092673 A1* | 3/2016 | LeMay | G06F 21/52 718/1 |

OTHER PUBLICATIONS

C Boot Camp CH7 Memory Stack vs Heap by Cribbel (Year: 2012).*
Task-pushing: a Scalable Parallel GC Marking Algorithm without Synchronization Operations by Wu (Year: 2007).*
A Parallel, Incremental and Concurrent GC for Servers by Ossia (Year: 2002).*
A Parallel, Real-Time Garbage Collector by Cheng (Year: 2001).*
Wu et al., Task-pushing: a Scalable Parallel GC Marking Algorithm without Synchronization Operations, Parallel and Distributed Processing Symposium, 2007.
Zhang et al., Improved Garbage Collection Algorithm for Incremental JVM, Computer Engineering, Jan. 2012, vol. 38 No. 1.

* cited by examiner

500

12500

1300

1400

1500

1600

1700

METHOD AND SYSTEM FOR PARALLEL MARK PROCESSING

CROSS REFERENCE TO OTHER APPLICATIONS

This application is a continuation-in-part of and claims priority to International (PCT) Application No. PCT/CN2017/77446 entitled PARALLEL MARKING PROCESSING METHOD AND DEVICE FOR GARBAGE COLLECTION filed Mar. 21, 2017 which is incorporated herein by reference in its entirety for all purposes, which claims priority to China Patent Application No. 201610187840.2 entitled PARALLEL MARK PROCESSING METHOD AND MEANS USED IN GARBAGE COLLECTION filed on Mar. 29, 2016 which is incorporated by reference in its entirety for all purposes.

FIELD OF THE INVENTION

The present application relates to a method and system for parallel mark processing.

BACKGROUND OF THE INVENTION

Garbage collection (GC) technology is used in many popular high-level language virtual machines such as Java. GC technology can be divided into two categories based on the relationship of the garbage collector (also referred to as "collector") to the host (also referred to as "mutator"). The two categories include: the mutator pauses while the collector works (abbreviated as "stop-the-world GC," i.e., STW-GC) and the mutator does not pause while the collector works (abbreviated as concurrent GC). Currently, model of a virtual machine with a totally concurrent GC is typically not implemented. Popular high-level language virtual machines, such as Java virtual machine (JVM) and VMware Infrastructure (VI), are all STW-GC or partially concurrent GC. Non-reference counting STW-GC techniques can be divided into three categories: mark-copy (tracking live objects and copying them to another semi-space), mark-sweep (tracking live objects and collecting dead objects for further memory allocation, the live objects are not moved), and mark-compact (tracking live objects and moving them together to remove memory fragments).

All memory in the popular high-level language virtual machines such as JVM and V8 is managed in a unified manner through heaps. A heap organizes memory using memory blocks of a specified size (the specified size corresponds to a "page," which is typically a multiple of an operating system memory page size) as the basic units. For example, the page size in a V8 virtual machine is 1 MB. Moreover, in the initial part of each memory block (i.e., page), one bitmap region is partitioned off for marking whether each object in the current page is a live object. An object tree is traced starting from its root object, and those objects that can be reached through the tracing are deemed to be live objects, while the unreachable objects are deemed to be dead objects and need to be garbage collected. A bitmap bit is used to indicate the live and dead states of an object. After all reachable objects have been marked, a garbage collector will examine the states and collect the memory of dead objects. For example, a bitmap digit of an object in a page corresponding to the header of that page is set to 1, which indicates that the object is a live object and should not be collected during GC.

The marking technique currently used in garbage collection is typically a single-thread marking technique. The number of marked objects continually increases, and the memory space that the marked objects occupy increases as the number of marked objects increases. Clearly, the current single-thread marking technique wastes large amounts of memory space and reduces processing performance and efficiency. A more efficient technique is needed.

SUMMARY OF THE INVENTION

The present application describes process for parallel mark processing used in garbage collection. This process uses limited memory to implement parallel mark processing of multiple threads and increases overall garbage collection performance.

The present application discloses a process for parallel mark processing used in garbage collection.

The present application discloses a device for parallel mark processing used in garbage collection.

An embodiment of the present application discloses a process for parallel mark processing used in garbage collection, comprising: traversing first objects in a virtual machine heap based on correspondences between memory blocks in the virtual machine heap and N marking threads, wherein N is an integer greater than 1, the memory capacity occupied by N marking threads is preset, and each marking thread includes: one private stack; pushing a first pointer of the currently processed first object into a private stack of the marking thread corresponding to the memory block where the first object is located, and performing first mark processing of the first object based on a push-in condition of the first pointer; after completing traversal of the first object, sending a thread start instruction to the N marking threads to cause the N marking threads, based on the push-in conditions of the first pointers in their respective private stacks, to synchronously perform mark processing used in garbage collection.

With the process for parallel mark processing used in garbage collection, traversing first objects in a virtual machine heap based on correspondences between memory blocks in the virtual machine heap and N marking threads, wherein the memory capacity occupied by N marking threads is preset. A first pointer of the currently processed first object is pushed into a private stack of the marking thread corresponding to the memory block where the first object is located, and first mark processing of the first object is performed based on the push-in condition of the first pointer. After traversal of the first objects is completed, a thread start instruction is sent to the N marking threads to cause the N marking threads, based on push-in conditions of the first pointers in their respective private stacks, to synchronously perform mark processing used in garbage collection. In this way, limited memory is used to implement parallel mark processing for multiple threads. The result is an increase in overall garbage collection performance.

The present application discloses a process for parallel mark processing used in garbage collection, comprising: each marking thread in preset N marking threads includes: one private stack. The process is applied in each marking thread. In some embodiments, the process applied in a first marking thread includes the following: a first marking thread removes, based on a thread start instruction, from a first private stack a first object's first pointer that was pushed in in advance; the first marking thread traverses a second object, which is referenced by the first object and indicated by the first pointer, and the second object is subjected to second mark processing based on correspondences between the preset N marking threads and memory blocks in a virtual machine heap.

With the process for parallel mark processing used in garbage collection, a first marking thread removes, based on a thread start instruction, from the first private stack the pre-pushed-in first pointer of the first object and traverses a second object, which is referenced by the first object and indicated by the first pointer. Moreover, the second object is subjected to second mark processing based on correspondences between the preset N marking threads and memory blocks in a virtual machine heap. Thus, through parallel mark processing by N marking threads with reference to the mark processing process of the first marking thread, the process implements parallel mark processing using limited memory and increases overall garbage collection performance.

The present application discloses a device for parallel mark processing used in garbage collection, comprising: a traversing module configured to traverse, based on correspondences between memory blocks in a virtual machine heap and N marking threads, first objects in the virtual machine heap, wherein N is an integer greater than 1, the memory capacity occupied by N marking threads is preset, and each marking thread includes: one private stack; a first marking module configured to push a first pointer of a first object into a private stack of the marking thread corresponding to the memory block where the first object is located, and perform first mark processing of the first object based on the push-in condition of the first pointer; a starting module configured to, after traversal of the first objects has been completed, send a thread start instruction to the N marking threads to cause the N marking threads, based on the push-in conditions of the first pointers in their respective private stacks, to synchronously perform mark processing used in garbage collection.

With the device for parallel mark processing used in garbage collection, the first marking thread traverses first objects in the virtual machine heap based on correspondences between memory blocks in a virtual machine heap and N marking threads, wherein the memory capacity occupied by N marking threads is preset. A first pointer of the currently processed first object is pushed into a private stack of the marking thread corresponding to the memory block where the first object is located, and first mark processing of the first object is performed based on the push-in condition of the first pointer. After traversal of the first objects has been completed, a thread start instruction is sent to the N marking threads to cause the N marking threads, based on the push-in conditions of the first pointers in their respective private stacks, to synchronously perform mark processing used in garbage collection. In this way, limited memory is used to implement parallel mark processing for multiple threads. The result is higher overall garbage collection performance.

The present application discloses a device for parallel mark processing used in garbage collection, comprising: each marking thread in preset N marking threads includes: one private stack; the device is applied in each marking thread, wherein the device applied in a first marking thread comprises: an acquiring module configured to remove from the first private stack the pre-pushed-in first pointer of the first object based on a thread start instruction; a second marking module configured to traverse second objects, which are referenced by the first object and indicated by the first pointer, and subject the second objects to second mark processing based on correspondences between the preset N marking threads and memory blocks in a virtual machine heap.

Based on the device for parallel mark processing used in garbage collection, a first marking thread removes, based on a thread start instruction, from the first private stack the pre-pushed-in first pointer of the first object and traverses a second object, which is referenced by the first object and indicated by the first pointer. Moreover, the second object is subjected to second mark processing based on correspondences between the preset N marking threads and memory blocks in a virtual machine heap. Thus, through parallel mark processing by N marking threads with reference to the mark processing process of the first marking thread, the device implements parallel mark processing using limited memory and increases overall garbage collection performance.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a system and method for parallel mark processing are described below.

Figure 1:
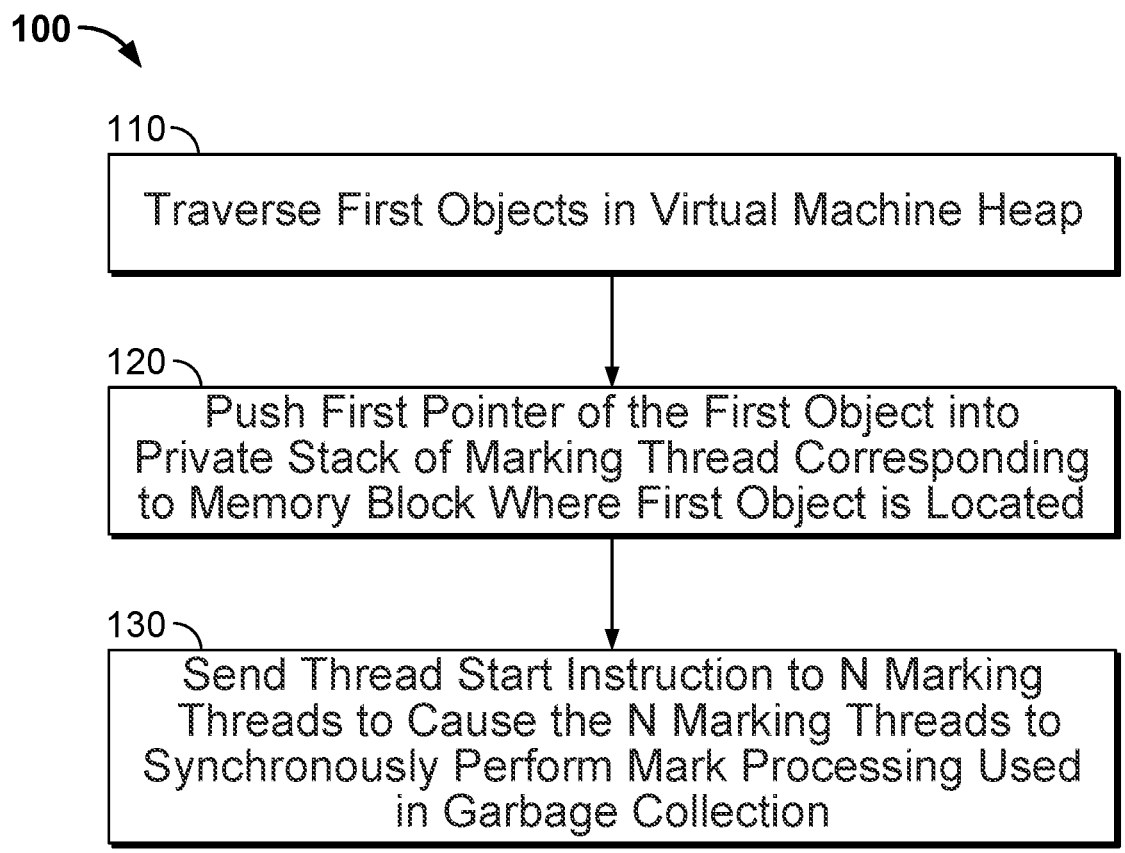
FIG. 1 is a flowchart of an embodiment of a process for parallel mark processing.

FIG. 1 is a flowchart of an embodiment of a process for parallel mark processing. In some embodiments, the process 100 is implements by a system or device 1100 of FIG. 11 and comprises:

In 110, the system traverses first objects in a virtual machine heap based on correspondences between memory blocks in the virtual machine heap and N marking threads. In some embodiments, N is an integer greater than 1, the memory capacity occupied by N marking threads is preset, and each marking thread includes: one private stack. A first object corresponds to a root object, the traversing operation is used to visit fields of root objects (field objects) and distribute these fields objects to corresponding marking threads according to their own memory block's id (0-(N−1)).

As an example, to increase efficiency of mark processing used in garbage collection, the process 100 uses of the parallel processing capability of a multi-core central processing unit (CPU). Each of the N pre-requested marking threads includes: one private stack. The private stack stores a pointer for an object that its marking thread is responsible for marking as either live or dead. In some embodiments, two marking bits are used to represent an object's state: live, dead and overflow.

Please note that N is an integer greater than 1 and that N can be determined according to the parallel processing capability of the actually applied CPU. For example, in the event that the parallel processing capability of the CPU is two cores, then marking threads limited by a capacity of 2 can be requested. In another example, in the event that the parallel processing capability of the CPU is four cores, then marking threads limited by a capacity of 4 can be requested. In yet another example, in the event that the parallel processing capability of the CPU is eight cores, then marking threads limited by a capacity of 8 can be requested.

As the number of marked objects increases, the existing mark processing technology will continually increase in the amount of memory space occupied by marking threads. This leads to lower mark processing performance and efficiency. Therefore, the process for parallel mark processing provided sets the memory capacity for occupation by N marking threads in advance. In other words, to ensure performance and efficiency of mark processing, the memory capacity occupied by N marking threads will not increase as marked objects overflow.

Please note that many possible techniques based on application needs can be used when setting the memory capacity for occupation by N marking threads, as shown in the following examples:

Example 1

Set the capacity for each marking thread.

Example 2

Set the total capacity for memory occupied by the N marking threads. Each marking thread can be unlimited (subject to the total capacity limit), or the largest marking thread can be limited.

To increase marking efficiency and to achieve multi-thread parallel mark load balancing, correspondences can be established in advance between memory blocks in a virtual machine heap and N marking threads. In other words, for each marking thread, a corresponding virtual machine heap memory block that it is responsible for marking can be configured in advance.

Please note that the correspondences between memory blocks in a virtual machine heap and N marking threads can be established according to actual application needs, as shown in the following examples:

Example 1

For each memory block, designate a corresponding marking thread.

Example 2

For each marking thread, designate a memory block that it is responsible for marking.

Subsequently, pre-stored first objects in the virtual machine heap are acquired from the virtual machine system, and the first objects in the virtual machine heap are traversed based on the correspondences set between memory blocks in a virtual machine heap and the N marking threads.

In 120, the system pushes a first pointer of the currently processed first object into a private stack of the marking thread corresponding to the memory block where the first object is located and performs first mark processing of the first object based on a push-in condition of the first pointer (e.g., whether the first pointer is successfully pushed into the private stack).

In 130, after traversal of the first objects has been completed, the system sends a thread start instruction to the N marking threads to cause the N marking threads, based on the push-in conditions of the first pointers in their respective private stacks, to synchronously perform mark processing used in garbage collection.

As an example, the first step is to determine the memory block in which the currently processed first object is located and then acquire, based on the above correspondences, the marking thread corresponding to the memory block in which the first object is located. A first pointer of the first object is pushed into a private stack of the marking thread corresponding to the memory block where the first object is located.

Next, depending on the push-in condition of the first pointer of the first object, first mark processing is performed on the currently processed first object. In other words, in the event that the first pointer of the current first object has been successfully pushed into a private stack of the corresponding marking thread, then a determination is made that the private stack is not overflowing, and the currently processed first object is marked as having a pushed-in status. In the event that the first pointer of the current first object failed to be pushed into the private stack of the corresponding marking thread, then a determination is made that the private stack is overflowing, and the currently processed first object is marked as having an overflowed status.

Please note that many ways of marking whether a first object is overflowing exist, and the ways can be selected based on need, as shown in the following examples:

Example 1

The push-in condition of the first object corresponding to the private stack of each marking thread can be recorded in list form.

Example 2

The push-in condition of the first object can be marked based on a corresponding position in a bitmap of the memory block where the first object is located.

After traversal of the first objects in the virtual machine heap has been completed, the following are to be deposited (e.g., stored) in the private stack of each marking thread: the first pointer of the first object in the memory block that the thread is responsible for marking. In the event that the private stack of a marking thread is overflowing, the private stack space is already full and depositing the first pointer of the first object in the memory block that this thread is responsible for marking is no longer possible. Thus, the first object is marked as overflowed. In other words, the bitmap bits corresponding to the first object that causes the marking thread's private stack overflow is set to an overflow state. In the event that the marking thread's private stack has new processing space, the depositing of the first pointer of the first object which is in the memory block that this thread is responsible for marking is continued.

Next, the N marking threads are launched. Thus, the N marking threads, based on the push-in conditions of the first pointers in their respective private stacks, synchronously perform mark processing used in garbage collection. In some embodiments, the N marking threads are launched by a collector.

With the process for parallel mark processing, the system traverses, based on correspondences between memory blocks in a virtual machine heap and N marking threads, first objects in the virtual machine heap. In some embodiments, the memory capacity occupied by the N marking threads is preset. A first pointer of the currently processed first object is pushed into a private stack of the marking thread corresponding to the memory block where the first object is located, and first mark processing of the first object is performed based on a push-in condition of the first pointer. After traversal of the first objects has been completed, a thread start instruction is sent to the N marking threads to cause the N marking threads, based on the push-in conditions of the first pointers in their respective private stacks, to synchronously perform mark processing used in garbage collection. In other words, limited memory is used to implement parallel mark processing for multiple threads. The result of the processing is an increased overall garbage collection performance.

Figure 2:
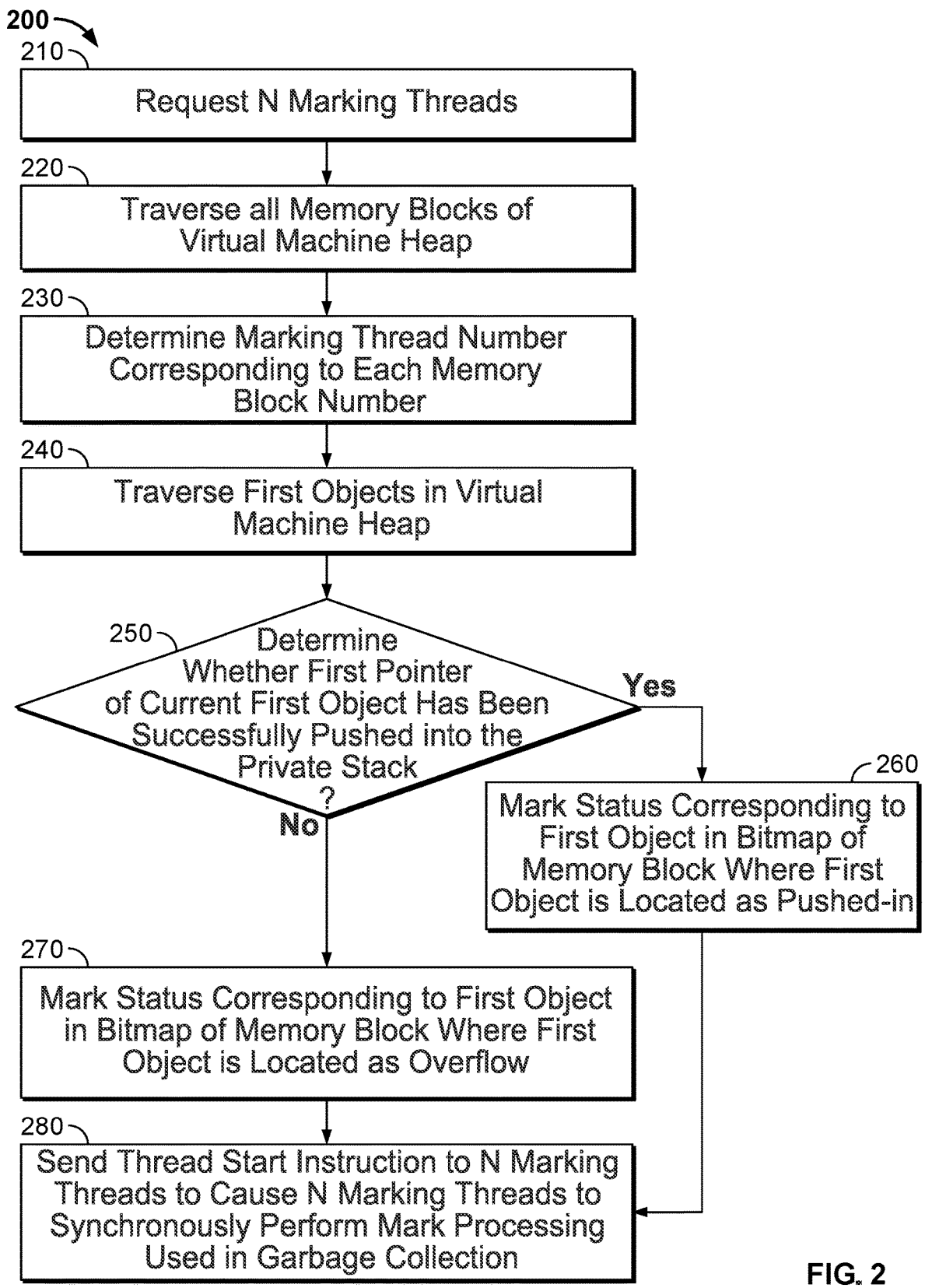
FIG. 2 is a flowchart of another embodiment of a process for parallel mark processing.

To more clearly explain the process whereby correspondences between memory blocks in a virtual machine heap and N marking threads are established and the first marking process, the following explanation is provided as shown in FIG. 2.

FIG. 2 is a flowchart of another embodiment of a process for parallel mark processing. In some embodiments, the process 200 is implements by a system 1100 of FIG. 11 and comprises:

In 210, the system requests N marking threads. In some embodiments, N is an integer greater than 1, the memory capacity occupied by N marking threads is preset, and each marking thread includes: one private stack.

As an example, the system sets, based on actual application need and central processing unit (CPU) multi-core processing capability, N, the number of marking threads, and the memory capacity occupied by the N marking threads. Each of the N marking threads includes its own private stack, which is used to store the pointer of the objects that this thread is responsible for marking.

In 220, the system traverses all the memory blocks of the virtual machine heap and allocates a number (or an identifier) to each memory block.

In 230, the system determines the marking thread number corresponding to each memory block number based on the memory block numbers and the total quantity of marking threads N.

As an example, a marking thread responsible for marking a memory block object is allocated to each memory block of a virtual machine heap. The memory blocks of the virtual machine heap are traversed and a number is allocated to each memory block.

Next, the system determines the marking thread number corresponding to each memory block number based on the memory block number and the total quantity of marking threads N.

Please note that there are many ways of determining the marking thread number corresponding to each memory block based on the memory block number and the total quantity of marking threads N. For example, the marking thread number corresponding to each memory block can be determined by acquiring the remainder from dividing total marking threads N by the memory block number. The formula is shown below:

ID=id % N, where:

N is total marking threads; "id" is the memory block number; "ID" is the marking thread number; "%" means the modulo processing after N is divided by "id."

For example, assuming that the total quantity of currently requested marking threads is 4 (N=4) and that the marking threads are individually numbered 0 through 3 and also that ten memory blocks exist and the memory blocks are individually numbered 1 through 10. The memory blocks and marking threads are allocated using the formula as follows:

Memory block number 1 corresponds to marking thread number 0.

Memory block number 2 corresponds to marking thread number 1.

Memory block number 3 corresponds to marking thread number 2.

Memory block number 4 corresponds to marking thread number 3.

Memory block number 5 corresponds to marking thread number 0.

Memory block number 6 corresponds to marking thread number 1.

Memory block number 7 corresponds to marking thread number 2.

Memory block number 8 corresponds to marking thread number 3.

Memory block number 9 corresponds to marking thread number 1.

Memory block number 10 corresponds to marking thread number 2.

In 240, the system traverses first objects in the virtual machine heap based on the correspondences between memory blocks in the virtual machine heap and N marking threads. The first pointer of the currently processed first object is pushed into a private stack of the marking thread corresponding to the memory block where the first object is located.

In 250, the system determines whether the first pointer of the current first object has been successfully pushed into the private stack of the corresponding marking thread.

In 260, in the event that the first pointer has been successfully pushed into the private stack of the corresponding marking thread, the system marks the status corresponding to the first object in the bitmap of the memory block where the first object is located as pushed-in.

In 270, in the event that the first pointer failed to be pushed into the private stack of the corresponding marking thread, the system marks the status corresponding to the first object in the bitmap of the memory block where the first object is located as overflow.

In 280, after traversal of the first objects has been completed, the system sends a thread start instruction to the N marking threads to cause the N marking threads, based on the push-in conditions of the first pointers in their respective private stacks, to synchronously perform mark processing used in garbage collection.

As an example, the memory block in which the currently processed first object is located is determined, and the system acquires, based on the correspondences, the marking thread corresponding to the memory block in which the first object is located. The first pointer of a first object is pushed into the private stack of the marking thread corresponding to the memory block where the first object is located.

Next, depending on the push-in condition of the first pointer of the first object, the first mark processing is performed on the currently processed first object.

In other words, in the event that the first pointer of the current first object was successfully pushed into the private stack of the corresponding marking thread, the system determines that the private stack is not overflowing, and the currently processed first object is marked as having a pushed-in status. In the event that the first pointer of the current first object failed to be pushed into the private stack of the corresponding marking thread, the system determines that the private stack is overflowing, and the currently processed first object is marked as having an overflowed status.

After traversal of the first objects has been completed, the following is to be deposited in the private stack of each marking thread: the first pointer of the first object in the memory block that this thread is responsible for marking. In the event that the private stack of the marking thread is overflowing, the overflow means that the private stack space is already full and depositing the first pointer of the first object in the memory block that the thread is responsible for marking is no longer possible. Thus, the first object is marked as overflowed. In the event that the marking thread's private stack has new processing space, the system deposits the first pointer of the first object which is in the memory block that the thread is responsible for marking.

Next, a thread start instruction is sent to N marking threads. Thus, N marking threads, based on the push-in conditions of the first pointers in their respective private stacks, synchronously performs mark processing used in garbage collection.

Figure 3:
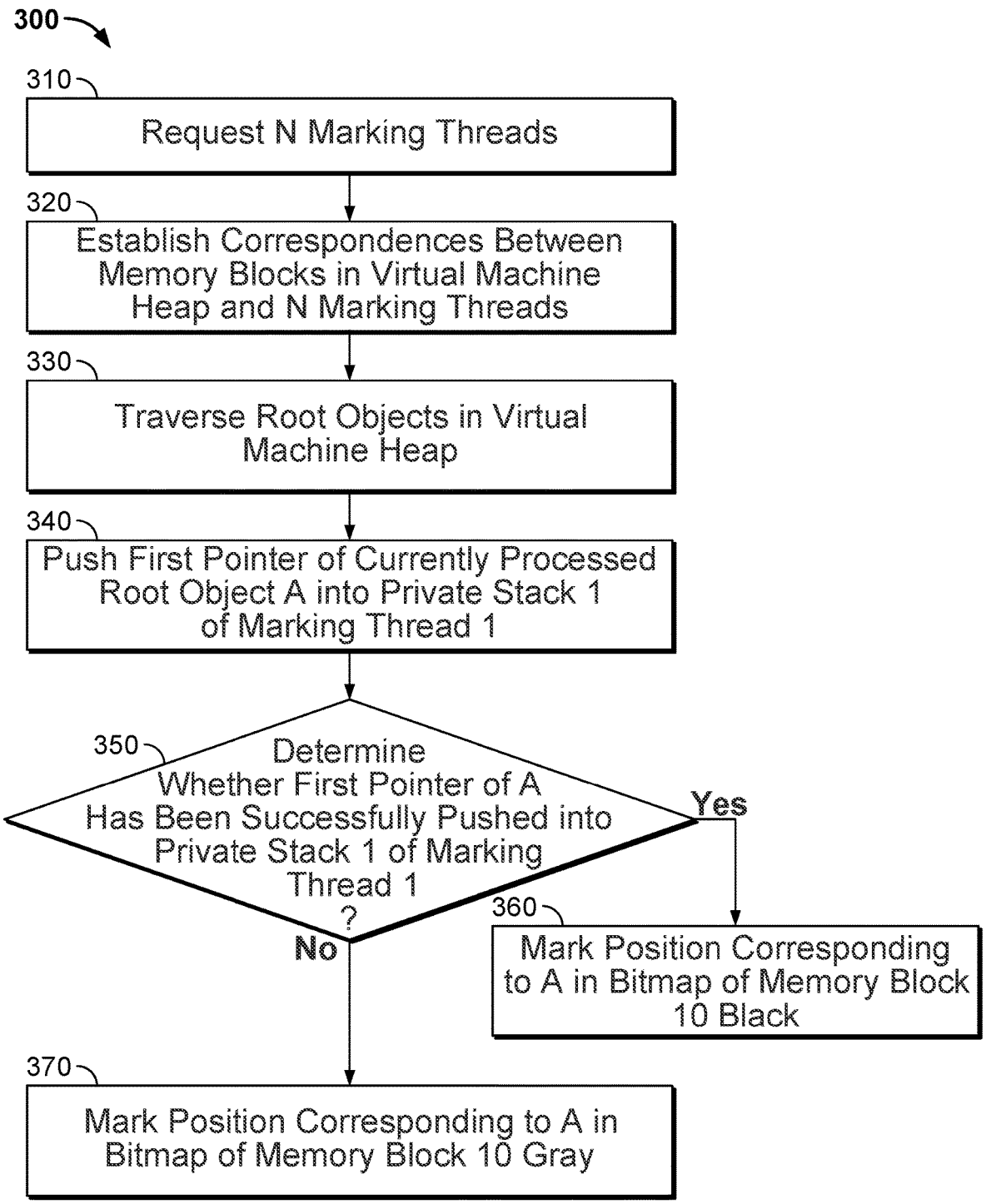
FIG. 3 is a flowchart of an embodiment of a process for first mark processing.

To explain the process whereby first objects are subjected to first mark processing, the following explanation is provided is shown in FIG. 3.

FIG. 3 is a flowchart of an embodiment of a process for first mark processing. In some embodiments, the process 300 is an implementation of operation 120 of FIG. 1.

Process 300 employs a color marking approach in memory block bitmaps to subject the push-in conditions of first objects to first mark processing. The specifics of the process 300 comprises:

In the event that the first pointer of the currently processed first object was successfully pushed into a private stack of the corresponding marking thread, the position corresponding to the first object in the memory block bitmap where the first object is located undergoes a black marking process. The black marking process is used to set the corresponding bitmap bits of a given object to black state.

In the event that the first pointer of the first currently processed object failed to be pushed into a private stack of the corresponding marking thread, then the position corresponding to the first object in the memory block bitmap where the first object is located undergoes a gray marking processing. The gray marking process is used to set the corresponding bitmap bits of a given object to gray state and the owner memory block is set to an overflow state.

Please note that the system subjects the positions corresponding to the first objects in memory block bitmaps to color processing based on the different push-in conditions of first pointers of first objects with respect to private stacks of corresponding marking threads, as described above, is merely illustrative and may be adjusted according to particular application needs.

The following description is based on the marking technique described above and uses the particular example of processing root object A in a virtual heap (the root object in the virtual heap in this example is the equivalent of the first object mentioned in the above embodiment). The process 300 is as follows:

In 310, the system requests N marking threads. In some embodiments, N is an integer greater than 1, the memory capacity occupied by N marking threads is preset, and each marking thread includes one private stack.

In 320, the system establishes correspondences between memory blocks in a virtual machine heap and N marking threads.

In 330, the system traverses root objects in the virtual machine heap. The system exits upon completion of the traversal; otherwise, control passes to operation 340.

In 340, the system pushes the first pointer of currently processed root object A into private stack 1 of marking thread 1 corresponding to memory block 10 where root object A is located.

In 350, the system determines whether the first pointer of A has been successfully pushed into private stack 1 of marking thread 1.

In 360, in the event that the first pointer of A was successfully pushed into private stack 1 of marking thread 1, the system marks the position corresponding to A in the bitmap of memory block 10 black, i.e., A has pushed-in status. Typically, the default color of the bitmap bits is white.

In 370, in the event that the first pointer of A failed to be pushed into private stack 1 of marking thread 1, the system marks the position corresponding to A in the bitmap of memory block 10 gray, i.e., A has overflowed status.

With the process 300 for parallel mark processing used in garbage collection, N marking threads are requested, all of the memory blocks of the virtual machine heap are traversed, and a number is allocated to each memory block. The system determines the marking thread number corresponding to each memory block number based on memory block number and the total quantity of marking threads N. Next, the first pointer of the currently processed first object is pushed into a private stack of the marking thread corresponding to the memory block where the first object is located. The first object undergoes first mark processing based on the push-in condition of the first pointer. After traversal of the first objects has been completed, a thread start instruction is sent to the N marking threads to cause the N marking threads, based on the push-in conditions of the first pointers in their respective private stacks, to synchronously perform mark processing used in garbage collection. In this way, limited memory is used to implement highly efficient parallel processing and, at the same time, load balancing of marking threads is implemented. The result is increased overall garbage collection performance.

After traversal of the first objects has been completed, the following is to have been deposited in the private stack of each marking thread: the first pointer of the first object in the memory block that this thread is responsible for marking. In the event that the private stack of a marking thread is overflowing, that means the private stack space is already full and that depositing the first pointer of the first object in the memory block that this thread is responsible for marking is not possible. Thus, these first objects are marked as overflowed. In the event that the marking thread's private stack has new processing space, the process of depositing the first pointer of the first object which is in the memory block that this thread is responsible for marking is continued.

Next, a thread start instruction is sent to N marking threads. Thus, N marking threads, based on the push-in conditions of the first pointers in their respective private stacks, synchronously perform mark processing used in garbage collection.

Please note that the process for processing N pre-requested marking threads is synchronous and parallel. The first marking thread mark processing process is used to illustrate the mark processing of N marking threads. Refer to the first marking thread for an explanation of the mark processing process for the other N−1 marking threads.

Figure 4:
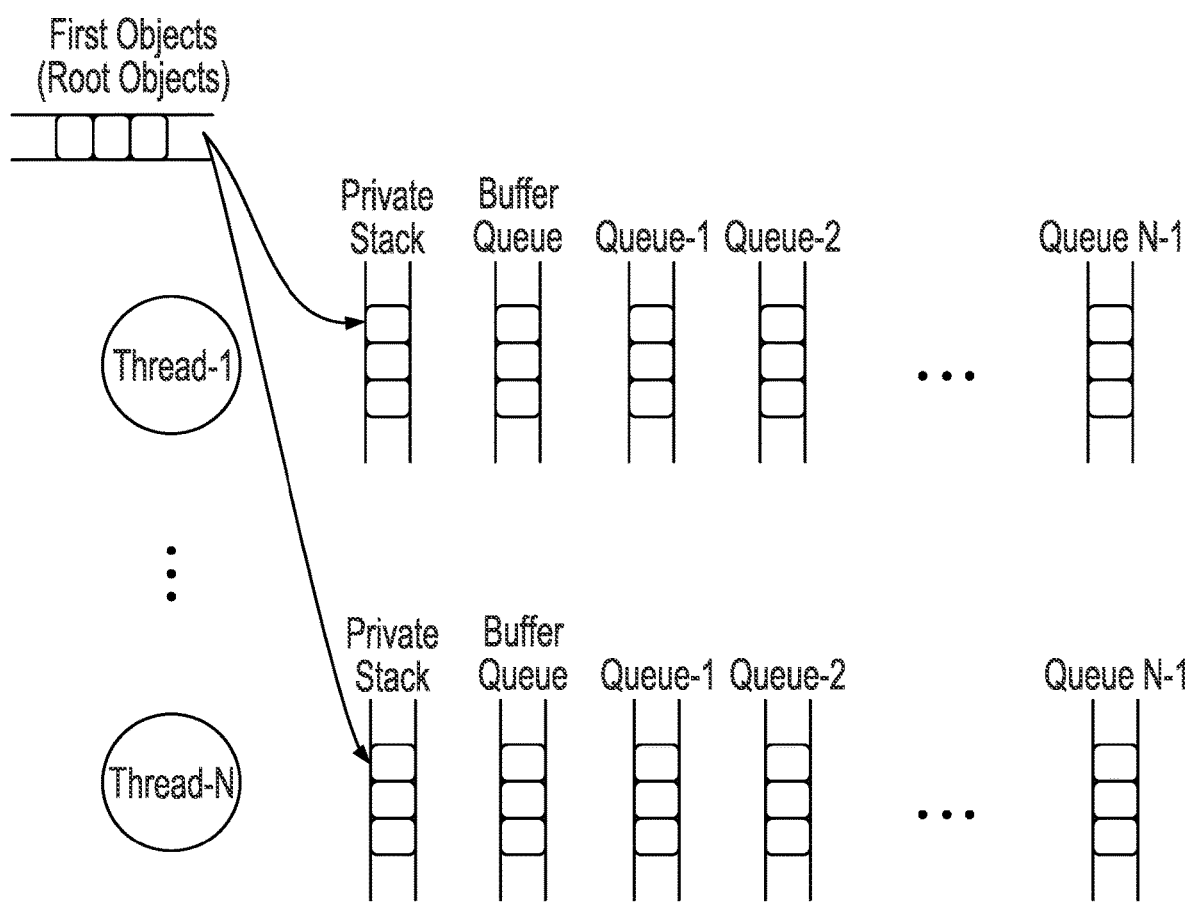
FIG. 4 is a diagram of an example of N pre-requested marking threads.

FIG. 4 is a diagram of an example of N pre-requested marking threads. The first objects correspond to root objects, which can be found in a virtual machine heap. The marking process is used to set the bitmap bits corresponding to a given object, and in this first marking process, only the fields of first objects (root objects) are visited and pushed into a corresponding marking thread's queue.

As shown in FIG. 4, the N pre-requested marking threads and the memory capacity occupied by N marking threads. The N marking threads include: Thread-1, Thread-2, . . . Thread-N. Each of these marking threads includes: one private stack. As a result of the processing described above, each private stack includes the pointer of the first object (root object) that this thread is responsible for marking. Buffer Queues are used to buffer the overflow objects' pointers when pushing an object to an owner marking thread's private stack. Queue-X (X=1, 2, . . . , N−1) are used to record the output object pointers located at the memory block corresponding to the marking thread-X.

Figure 5:
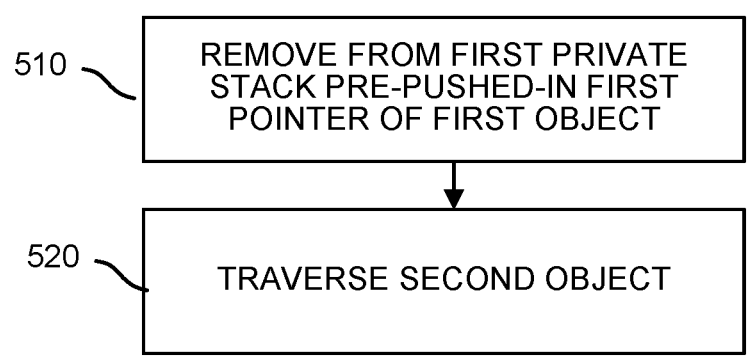
FIG. 5 is a first flowchart of an example of a process for mark processing.

FIG. 5 is a first flowchart of an example of a process for mark processing.

As shown in FIG. 5, the example of a process for mark processing of a first thread (Thread-1) of FIG. 4 is used. The process 500 for mark processing is implemented by the first marking thread of FIG. 4 and includes:

In 510, the first marking thread removes, based on a thread start instruction, from the first private stack a pre-pushed-in first pointer of the first object. In other words, the removing operation includes the marking thread doing a stack-pop, so that the pre-pushed-in first object (root object) is removed.

In 520, the first marking thread traverses a second object, which is referenced by the first object and indicated by the first pointer. In other words, the traversing operation is implemented by visiting the fields of first object just like traversing an object tree. Moreover, the second object is subjected to second mark processing based on correspondences between the preset N marking threads and memory blocks in a virtual machine heap.

As an example, after the first marking thread receives the thread start instruction, the first marking thread removes, based on the thread start instruction, from the first private stack the pre-pushed-in first pointer of the first object.

Next, the first marking thread queries a pre-stored object relationship table and acquires the second object indicated by the currently processed first pointer. Please note that the second object is a reference object of the first object.

The first marking thread traverses the currently processed second object indicated by the first pointer and determines, based on the preset correspondences between N marking threads and memory blocks in the virtual machine heap, whether the marking thread responsible for processing the memory block where the current second object is located is the thread itself and thus determines whether to perform second mark processing on the second object.

In some embodiments, the first marking thread removes, based on a thread start instruction, from the first private stack the pre-pushed-in first pointer of the first object, and traverses a second object, which is referenced by the first object and indicated by the first pointer. Moreover, the second object is subjected to second mark processing based on the correspondences between the preset N marking threads and memory blocks in a virtual machine heap. Thus, through parallel mark processing by the N marking threads with reference to the mark processing process of the first marking thread, the process 500 implements parallel mark processing using limited memory and increases overall garbage collection performance.

Figure 6A:
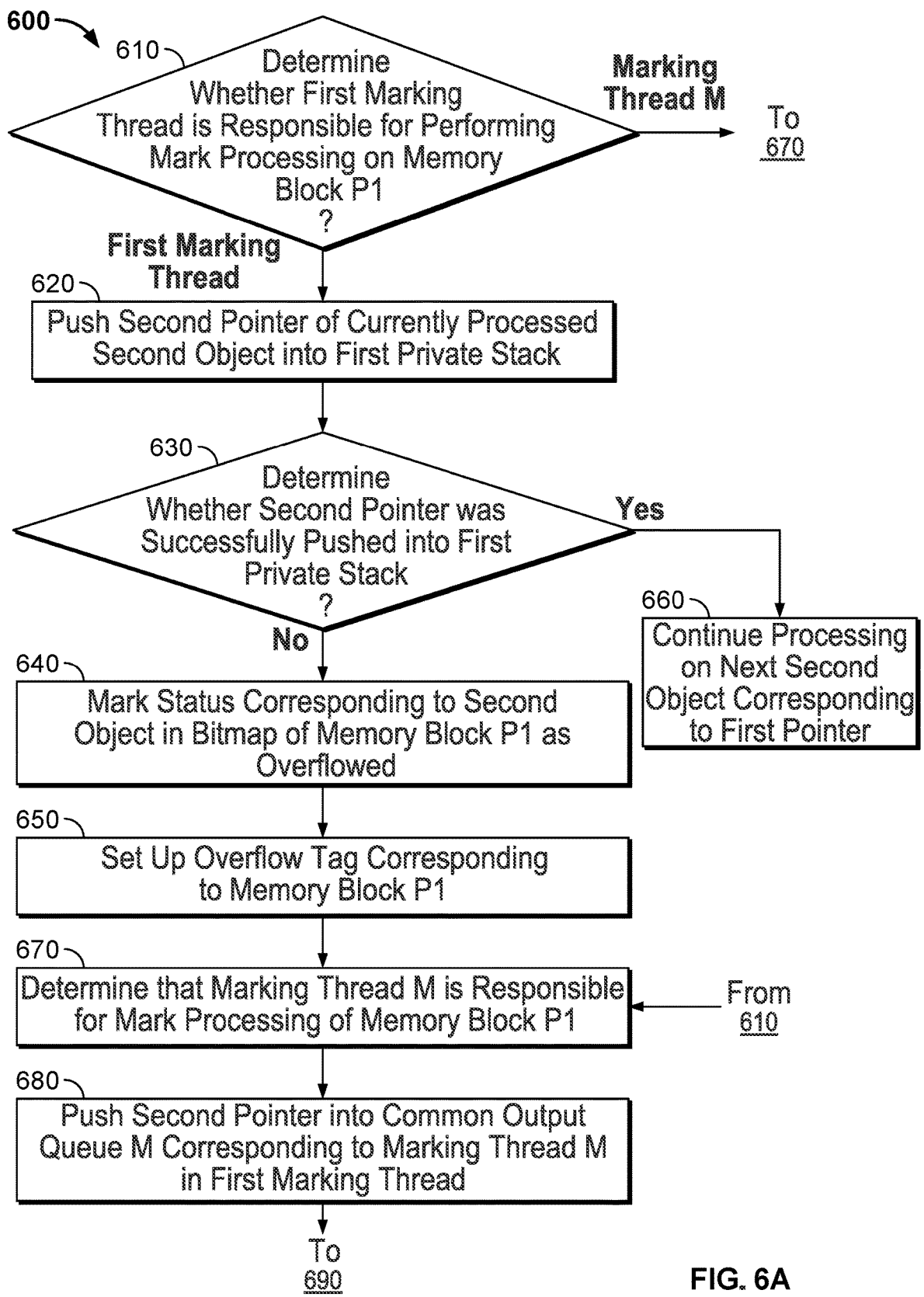
FIGS. 6A and 6B are second flowcharts of the example of the process for mark processing.
Figure 6B:
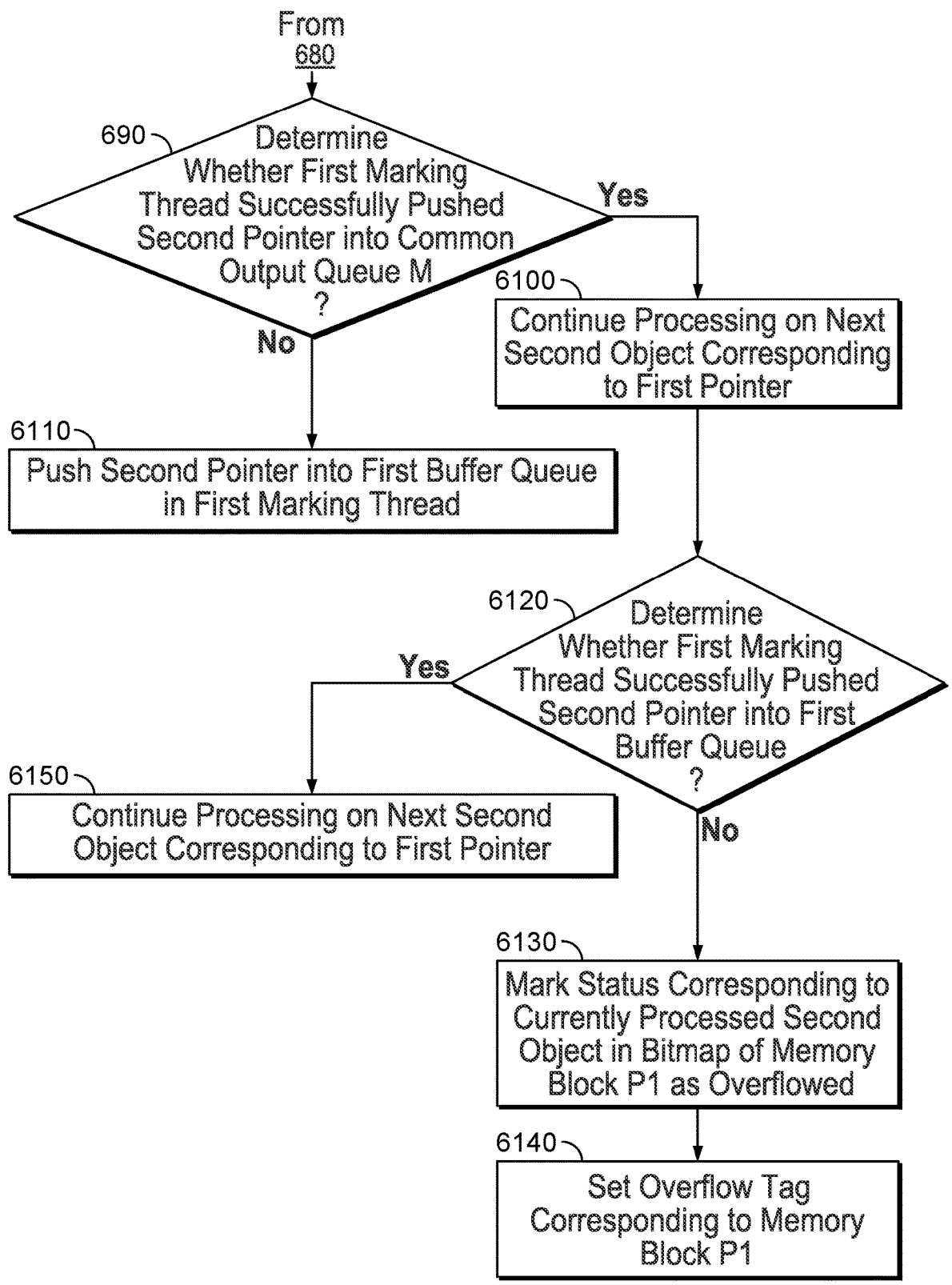

FIGS. 6A and 6B are second flowcharts of the example of the process for mark processing.

Based on the example shown in FIG. 4, each marking thread further includes: N−1 common output queues (queue-1, queue-2, . . . queue-N−1), and one buffer queue (buf-queue). The N−1 common output queues are used to store pointers of objects which the other N−1 marking threads are responsible for marking. In some embodiments, the common output queues are used to store object pointers corresponding to other marking threads. For example, Queue-i corresponds to marking thread-i, so that when marking thread-i has processed all the objects in it's private stack, marking thread-i will lookup the Queue-i in the other marking threads to pop the stored objects into its own private stack. When the common output queues corresponding to the other N−1 marking threads are overflowing, the one buffer queue is used to buffer pointers of the objects which the other N−1 marking threads are responsible for marking.

In FIGS. 6A and 6B, continuing to use the example of the mark processing process for a first marking thread (Thread-1), the process 600 is an implementation of operation 520 of FIG. 5 and includes:

In 610, the first marking thread determines, based on correspondences, whether the first marking thread is responsible for performing mark processing on memory block P1 where the currently processed second object is located. In this example, the second object is assumed to be located in memory block P1.

As an example, the first marking thread determines, based on correspondences between the preset N marking threads and memory blocks in a virtual machine, whether the first marking thread is responsible for performing mark processing on memory block P1 where the currently processed second object is located.

In the event that the first marking thread learns that the marking thread responsible for subjecting memory block P1 to mark processing is the first marking thread, i.e., that the first marking thread is itself responsible for subjecting the memory block P1 to mark processing, then the first marking thread proceeds to perform operations 620 to 660.

In the event that the first marking thread learns that the marking thread responsible for subjecting memory block P1 to mark processing is marking thread M, and marking thread M is not the first marking thread, i.e., that the first marking thread is not itself responsible for subjecting the memory block P1 to mark processing, then the first marking thread proceeds to perform operations 670 to 6150.

In 620, the first marking thread pushes the second pointer of the currently processed second object into the first private stack.

As an example, the path branching from a determination of operation 610 that the first marking thread is responsible for performing mark processing on the memory block P1 is: the first marking thread pushes the pointer of the object that the first marking thread is responsible for processing into its own private stack and performs processing. In other words, the first marking thread pushes the second pointer of the currently processed second object into the first private stack and performs second mark processing.

In 630, the first marking thread determines whether the second pointer was successfully pushed into the first private stack.

As an example, the first marking thread determines whether the second pointer of the currently processed second object was successfully pushed into its own first private stack.

In the event that the first marking thread failed to push the second pointer of the currently processed second object into its own first private stack, the first marking thread performs operations 640 and 650 to subject the second object to overflowed status mark processing.

In the event that the first marking thread succeeded in pushing the second pointer of the currently processed second object into its own first private stack, the first marking thread performs operation 660 to subject the next second object to second mark processing.

In 640, the first marking thread marks the status corresponding to the second object in the bitmap of the memory block P1 as overflowed.

In 650, the first marking thread sets up an overflow tag corresponding to the memory block P1.

As an example, the path branching from the determination in operation 630 that the first marking thread failed to push the second pointer of the currently processed second object into its own first private stack has the status of the second object set to overflowed. For example, the status corresponding to the second object in the bitmap of the memory block P1 is marked as overflowed. Moreover, an overflow tag corresponding to the memory block P1 is set.

In 660, in the event that the first marking thread succeeded in pushing the second pointer into the first private stack, the first marking thread continues processing on the next second object corresponding to the first pointer. As an example, the path branching from a determination in operation 630 that the first marking thread succeeded in pushing the second pointer into the first private stack continues processing on the next second object corresponding to the first pointer removed from the first private stack.

In 670, the first marking thread determines that marking thread M is responsible for mark processing of the memory block P1.

In 680, the first marking thread pushes the second pointer into the common output queue M corresponding to the marking thread M in the first marking thread.

As an example, the path branching from a determination in operation 610 that the first marking thread is not responsible for mark processing of the memory block P1 determines that marking thread M is responsible for mark processing of the memory block P1 based on the correspondences of N marking threads with memory blocks in the virtual machine heap.

Next, the first marking thread pushes the second pointer of the currently processed second object into common output queue M corresponding to marking thread M in the first marking thread to cause the marking thread M subsequently to acquire from common output queue M in the first marking thread the second pointer of the currently processed second object. Queue-0 corresponds to a buffer queue.

Referring to FIG. 6B, in 690, the first marking thread determines whether the first marking thread successfully pushed the second pointer into the common output queue M.

The first marking thread determines whether the first marking thread succeeded in pushing the second pointer of the currently processed second object into common output queue M.

In the event that the first marking thread succeeded in pushing the second pointer of the currently processed second object into common output queue M in the first marking thread, the first marking thread performs operation 6100 to continue processing on the next second object corresponding to the first pointer acquired from the first private stack.

In the event that the first marking thread failed to push the second pointer of the currently processed second object into common output queue M in the first marking thread, the first marking thread performs operation 6110, whereby the second pointer is buffered by the first buffer queue of the first marking thread.

In 6100, the first marking thread continues processing on the next second object corresponding to the first pointer.

As an example, the path branching from the determination in operation 690 that the first marking thread succeeded in pushing the current second pointer into common output queue M in the first marking thread is: continue processing on the next second object corresponding to the first pointer described above.

In 6110, the first marking thread pushes the second pointer into the first buffer queue in the first marking thread.

As an example, the path branching from a determination in 690 that the first marking thread failed to push the current second pointer into common output queue M in the first marking thread is: push the second pointer into the first buffer queue in the first marking thread.

In 6120, the first marking thread determines whether the first marking thread successfully pushed the second pointer into the first buffer queue.

As an example, the first marking thread determines whether the first marking thread succeeded in pushing the second pointer into the first buffer queue of the first marking thread.

In the event that the first marking thread failed to push the second pointer into the first buffer queue, the first marking thread performs operations 6130 and 6140, whereby the currently processed second object is marked as overflowed.

In the event that the first marking thread succeeded in pushing the second pointer into the first buffer queue, the first marking thread performs operation 6150, whereby mark processing is continued on the second object.

In 6130, the first marking thread marks the status corresponding to the currently processed second object in the bitmap of the memory block P1 as overflowed.

In 6140, the first marking thread sets an overflow tag corresponding to the memory block P1.

As an example, the path branching from a determination in operation 6120 that the first marking thread failed to push the second pointer into the first buffer queue is: mark status corresponding to the currently processed second object in the bitmap of the memory block P1 as overflowed and then set an overflow tag corresponding to the memory block P1.

In 6150, the first marking thread continues processing on the next second object corresponding to the first pointer. In some embodiments, the first marking thread visits the next second object through a reference relationship since the next second object can be specified by a field of the first object or referenced by the first object.

As an example, the path branching from a determination in operation 6120 that the first marking thread succeeded in pushing the second pointer into the first buffer queue is: continue processing on the next second object corresponding to the current first pointer.

Building on process 600 in FIGS. 6A and 6B, prior to operation 610, the process 600 further comprises:

The first marking thread queries the status mark corresponding to the second object in the bitmap of memory block P1 where the currently processed second object is located. In the event that the status mark corresponding to the second object is unmarked, the first marking thread changes the status corresponding to the second object to pushed-in status.

Please note that there are many ways to mark whether a second object has overflowed, and examples of marking whether a second object has overflowed include the following:

Example 1

The push-in condition can be recorded for each second object in list form.

Example 2

The push-in condition of a second object can be marked based on a corresponding position in the bitmap of the memory block where the second object is located.

In some embodiments, the first marking thread removes, based on a thread start instruction, from the first private stack the pre-pushed-in first pointer of the first object and traverses a second object, which is referenced by the first object and indicated by the first pointer. In addition, the second object is subjected to second mark processing based on correspondences between the preset N marking threads and memory blocks in a virtual machine heap.

Thus, through parallel mark processing by N marking threads with reference to the mark processing process of the first marking thread, the process 600 implements highly efficient parallel marking using limited memory, simultaneously implements load balancing of marking threads, and thus reduces CPU cache coherence conflicts and increases overall garbage collection performance.

Figure 7:
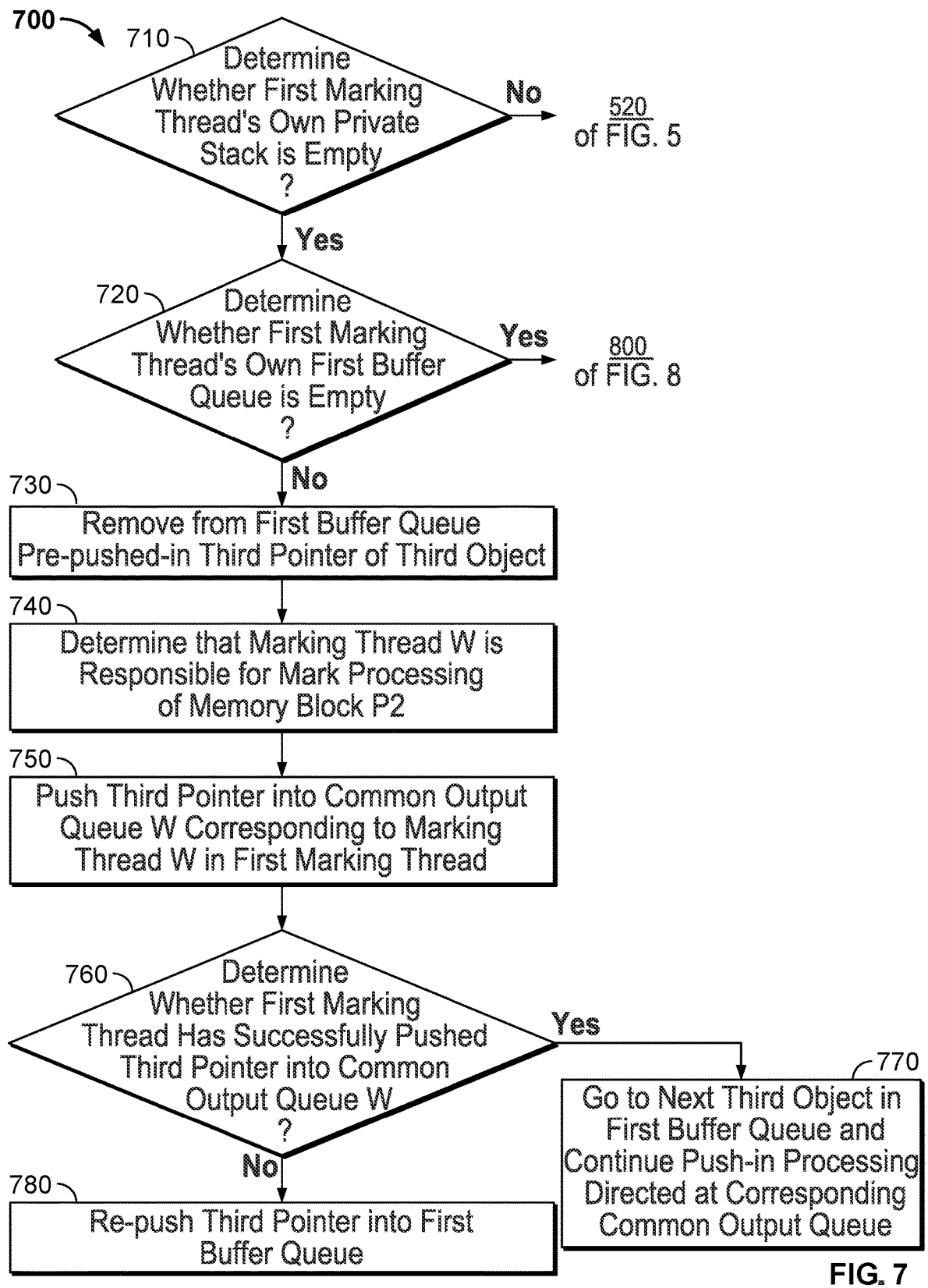
FIG. 7 is a third flowchart of the example of the process for mark processing.

FIG. 7 is a third flowchart of the example of the process for mark processing.

Referring back to FIG. 4, each marking thread includes: one private stack, N−1 common output queues (queue-1, queue-2, . . . queue-N−1), and one buffer queue (buf-queue). The one private stack is used to store pointers of objects that the thread is responsible for marking. The N−1 common output queues are used to store pointers of the objects for which the other N−1 marking threads are responsible for marking. In the event that the common output queues corresponding to the other N−1 marking threads are overflowing, the one buffer queue is used to buffer pointers of the objects for which the other N−1 marking threads are responsible for marking.

Referring back to FIG. 7, in some embodiments, the process 700 comprises:

In 710, after receiving a thread start order, the first marking thread determines whether the first marking thread's own private stack is empty.

As an example, the first marking thread determines whether the first marking thread's own first private stack is empty.

In the event that the first private stack of the first marking thread is not empty, the first marking thread removes, based on operation 520 of FIG. 5, from the first private stack the pre-pushed-in first pointer of the first object and performs processing based on the implementation process shown in FIG. 5 or 6, and will not be further discussed for conciseness.

In the event that the first private stack of the first marking thread is empty, the first marking thread performs operation 720.

In 720, the first marking thread determines whether the first marking thread's own first buffer queue is empty.

As an example, the first marking thread determines whether the first marking thread's own first buffer queue is empty.

In the event that the first buffer queue in the first marking thread is not empty, the first marking thread performs operation 730, and thus performs allocation processing for a third object whose processing is not the responsibility of the first marking thread, directing the allocation processing at a common output queue corresponding to the third object in the first marking thread.

Figure 8:
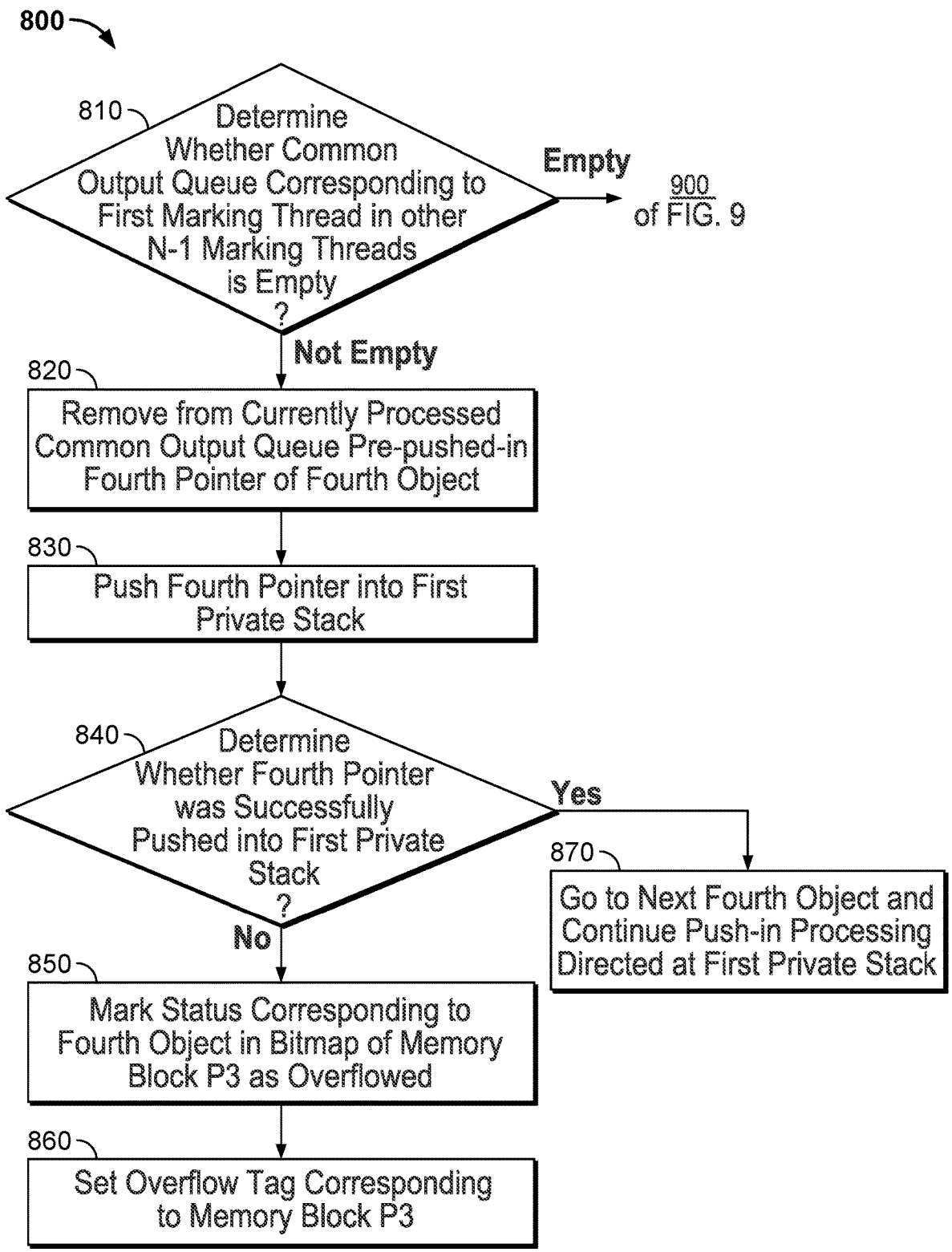
FIG. 8 is a fourth flowchart of the example of the process for mark processing.

In the event that the first buffer queue in the first marking thread is empty, then the process 800 of FIG. 8 describes how mark processing is further performed on a fourth object in the common output queues corresponding to the first marking thread in the other N−1 marking threads.

Referring back to FIG. 7, in 730, the first marking thread removes from the first buffer queue the pre-pushed-in third pointer of the third object. In some embodiments, the first marking thread is not responsible for mark processing of memory block P2 where the currently processed third object is located.

In 740, the first marking thread determines, based on the correspondences, that marking thread W is responsible for mark processing of memory block P2 where the currently processed third object is located. For each object, an object's memory block can be computed from the object pointer because the memory block is aligned to powers of 2 and a memory block pointer can easily computed using logic shift operations.

In 750, the first marking thread pushes the third pointer into common output queue W corresponding to the marking thread W in the first marking thread.

As an example, the first marking thread removes from its own first buffer queue the pre-pushed-in third pointer of the third object because the object deposited in the first buffer queue is to be placed in a common output queue of the first marking thread for processing by corresponding other marking threads. In the event that the common output queue of the first marking thread overflows, the overflowed third object is placed as a buffer in the first buffer queue of the first marking thread.

As an aspect, the first marking thread is not responsible for the marking process of memory block P2 where the currently processed third object is located. The first marking thread determines, based on the correspondences between memory blocks in the virtual machine stack and marking threads, that marking thread W is responsible for mark processing of memory block P2 where the currently processed third object is located.

Next, the first marking thread pushes the third pointer into common output queue W corresponding to marking thread W in the first marking thread so that marking thread W can acquire the third pointer from the common output queue of the first marking thread for mark processing.

In 760, the first marking thread determines whether the first marking thread has successfully pushed the currently processed third pointer into the common output queue W.

In 770, the first marking thread goes to the next third object in the first buffer queue and continues push-in processing directed at the corresponding common output queue.

In 780, the first marking thread re-pushes the third pointer into the first buffer queue.

As an example, the first marking thread determines whether the first marking thread succeeded in pushing the currently processed third pointer into its own common output queue W.

In the event that the first marking thread succeeded in pushing the third pointer into its own common output queue W, the first marking thread performs operation 770, continuing to subject the corresponding common output queue to push-in processing with regard to the next third object in the first buffer queue.

In the event that the first marking thread failed to push the third pointer into its own common output queue W, the first marking thread re-pushes the third pointer into the first buffer queue in operation 780. At this point, an overflow problem does not exist because the third pointer was removed from the first buffer queue of this thread.

In some embodiments, in the event that the first private stack of the first marking thread is empty and the first buffer queue is not empty, the pre-pushed-in third pointer of the third object is removed from the first buffer queue. The common output queue of the corresponding marking thread is subjected to push-in processing in this thread so that the marking thread corresponding to the third object can perform mark processing on the marking thread. Thus, through coordinated, parallel mark processing performed by N marking threads with reference to the mark processing process of the first marking thread, the parallel mark processing implements highly efficient parallel marking using limited memory, simultaneously implements load balancing of marking threads, and thus reduces CPU cache coherence conflicts and increases overall garbage collection performance.

FIG. 8 is a fourth flowchart of the example of the process for mark processing. In some embodiments, the process 800 is an implementation of operation 720 of FIG. 7. The process 800 describes how mark processing is further performed on fourth objects in common output queues corresponding to the first marking thread in the other N−1 marking threads and comprises:

In 810, the first marking thread determines whether a common output queue corresponding to the first marking thread in the other N−1 marking threads is empty.

As an example, the first marking thread determines whether a common output queue corresponding to the first marking thread in the other N−1 marking threads is empty. The first marking thread (assuming, e.g., thread-k) examines whether Queue-k in the other marking threads are empty, which means that there is no object produced by the other marking threads for the first marking thread to process.

In the event that a common output queue corresponding to the first marking thread in the other N−1 marking threads is not empty, the first marking thread performs operation 820. Thus, the first marking thread acquires from another marking thread a fourth object whose processing is the responsibility of this thread and directs push-in processing at the first private stack of this thread.

Figure 9:
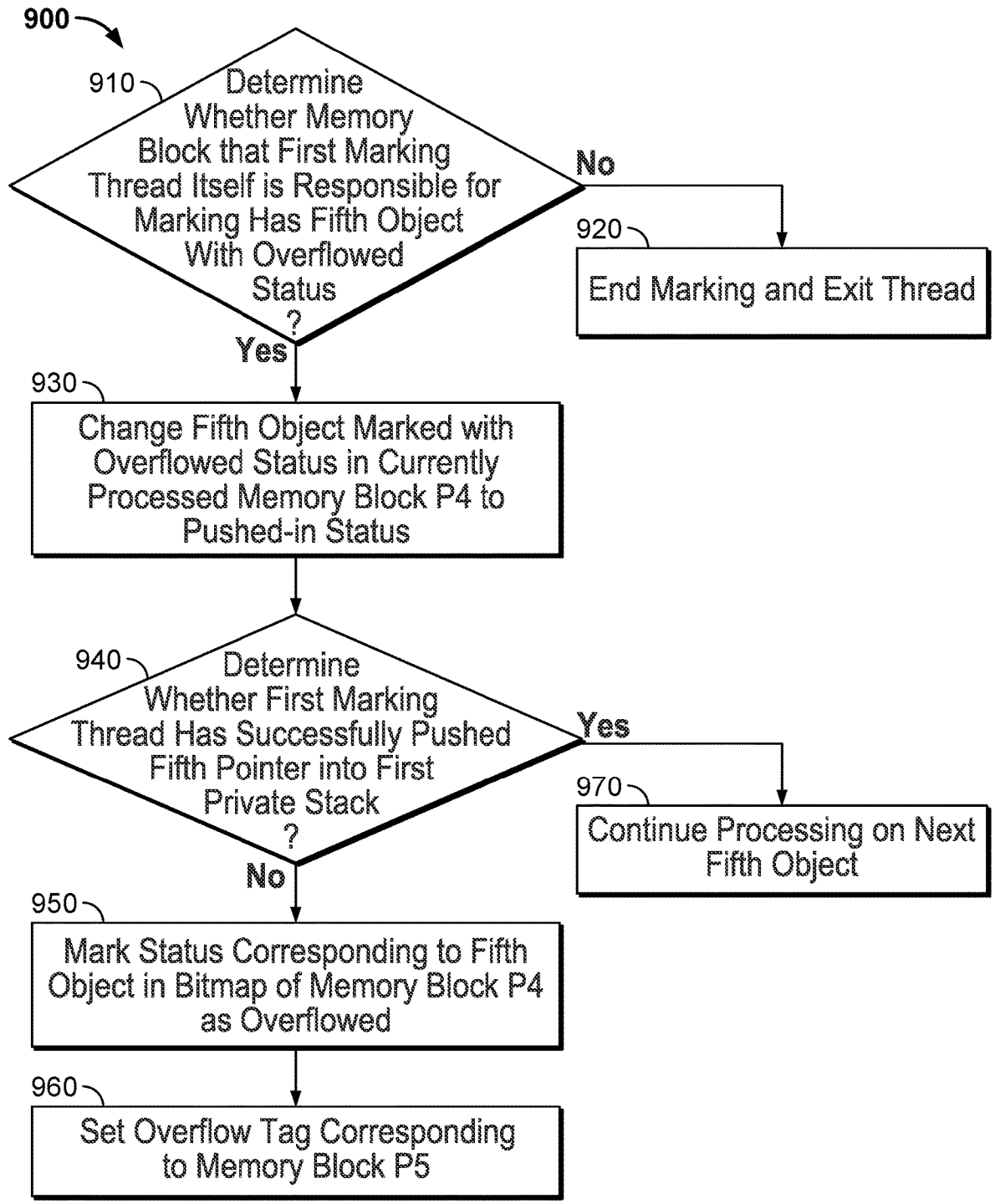
FIG. 9 is a fifth flowchart of the example of the process for mark processing.

In the event that a common output queue corresponding to the first marking thread in the other N−1 marking threads is empty, the process 900 of FIG. 9 describes how mark processing is further performed on a fifth object whose marking is the responsibility of the first object and which has overflow status.

Referring back to FIG. 8, in 820, the first marking thread removes from the currently processed common output queue the pre-pushed-in fourth pointer of the fourth object. In some embodiments, the fourth object was pushed in in advance by the marking thread T. The first marking thread is responsible for mark processing of memory block P3 where the fourth object is located.

In 830, the first marking thread pushes the fourth pointer into the first private stack.

As an example, in the event that the determination in 810 is that a common output queue corresponding to the first marking thread in the other N−1 marking threads is not empty, that means that the other marking threads still have the fourth object, which is in need of mark processing by the first marking thread.

Next, the first marking thread removes from the currently processed common output queue the pre-pushed-in fourth pointer of the fourth object. In some embodiments, the fourth object was pushed in in advance by marking thread T. Moreover, the first marking thread is responsible for mark processing of memory block P3 where the fourth object is located.

In 840, the first marking thread determines whether the fourth pointer was successfully pushed into the first private stack.

In 850, the first marking thread marks the status corresponding to the fourth object in the bitmap of the memory block P3 as overflowed.

In 860, the first marking thread sets an overflow tag corresponding to the memory block P3.

In 870, the first marking thread goes to the next fourth object and continues push-in processing directed at the first private stack.

As an example, the first marking thread determines whether the fourth pointer was successfully pushed into the private stack of this thread.

In the event that the first marking thread failed to push the fourth pointer into the first private stack of this thread, the first marking thread performs operations 850 and 860.

In the event that the first marking thread succeeded in pushing the fourth pointer into the first private stack of this thread, the first marking thread performs operation 870.

In some embodiments, the first marking thread is empty in the first private stack and first buffer queue, and a common output queue corresponding to the first marking thread in other marking threads is not empty. The first marking thread removes the pre-pushed-in fourth pointer of the fourth object and performs push-in processing on the first private stack in this thread. Thus, through coordinated, parallel mark processing performed by N marking threads with reference to the mark processing process of the first marking thread, the process implements highly efficient parallel marking using limited memory, simultaneously implements load balancing of marking threads, and thus reduces CPU cache coherence conflicts and increases overall garbage collection performance.

FIG. 9 is a fifth flowchart of the example of the process for mark processing. In some embodiments, the process 900 is implemented after operation 810 of FIG. 8 is performed, when a determination is made that a common output queue corresponding to the first marking thread in the other N−1 marking threads is empty. The process 900 describes how mark processing is further performed on a fifth object which has overflowed status, is implemented by the first marking thread, and comprises:

In 910, the first marking thread determines whether the memory block that the first marking thread itself is responsible for marking has a fifth object with overflowed status.

In 920, in response to a determination that the memory block whose marking is the responsibility of the first marking thread does not have a fifth object with overflowed status, the first marking thread ends marking, and exits thread.

In 930, in response to a determination that the memory block whose marking is the responsibility of the first marking thread does have a fifth object with overflowed status, the first marking thread changes the fifth object marked with overflowed status in currently processed memory block P4 to pushed-in status and pushes the fifth pointer of the current fifth object into the first private stack.

As an example, the first marking thread determines whether the memory block that the first marking thread itself is responsible for marking has a fifth object with overflowed status.

In the event that the memory block whose marking is the responsibility of the first marking thread does not have a fifth object with overflowed status, all of the objects which this thread is responsible for marking have been traversed, end marking, and perform operation 720 to exit the thread.

In the event that the memory block whose marking is the responsibility of the first marking thread does have a fifth object with overflowed status, not all of the objects which this first marking thread is responsible for marking have been traversed. Next, the first marking thread performs operation 930. The first marking thread changes the fifth object marked with overflowed status in currently processed memory block P4 to pushed-in status and pushes the fifth pointer of the fifth object into the first private stack.

In 940, the first marking thread determines whether the first marking thread has successfully pushed the fifth pointer into the first private stack.

In 950, in the event that the first marking thread failed to push the fifth pointer into the first private stack, the first marking thread marks the status corresponding to the fifth object in the bitmap of the memory block P4 as overflowed.

In 960, the first marking thread sets an overflow tag corresponding to the memory block P5.

In 970, in the event that the first marking thread successfully pushed the fifth pointer into the first private stack, the first marking thread continues processing on the next fifth object.

As an example, the first marking thread determines whether the first marking thread succeeded in pushing the currently processed fifth pointer into its own first private stack.

In the event that the first marking thread failed to push the fifth pointer into its own first private stack, first private stack space is insufficient and overflowing. Thus, operations 950 and 960 are performed, which includes: marking the status corresponding to the fifth object in the bitmap of memory block P4 where the fifth object is located as overflowed, and then setting an overflow tag corresponding to the memory block P5.

In the event that the first marking thread successfully pushed the fifth pointer into the first marking thread's own first private stack, then perform operation 970, which includes continue processing on the next fifth object.

As described above, when the first marking thread is empty in the first private stack and the first buffer queue is in a common output queue corresponding to the first marking thread in other marking threads, push-in processing is performed based on the fifth object with overflowed status that this thread is responsible for marking. Thus, through parallel mark processing by N marking threads with reference to the mark processing process of the first marking thread, the process 900 implements highly efficient parallel marking using limited memory and increased overall garbage collection performance.

Figure 10:
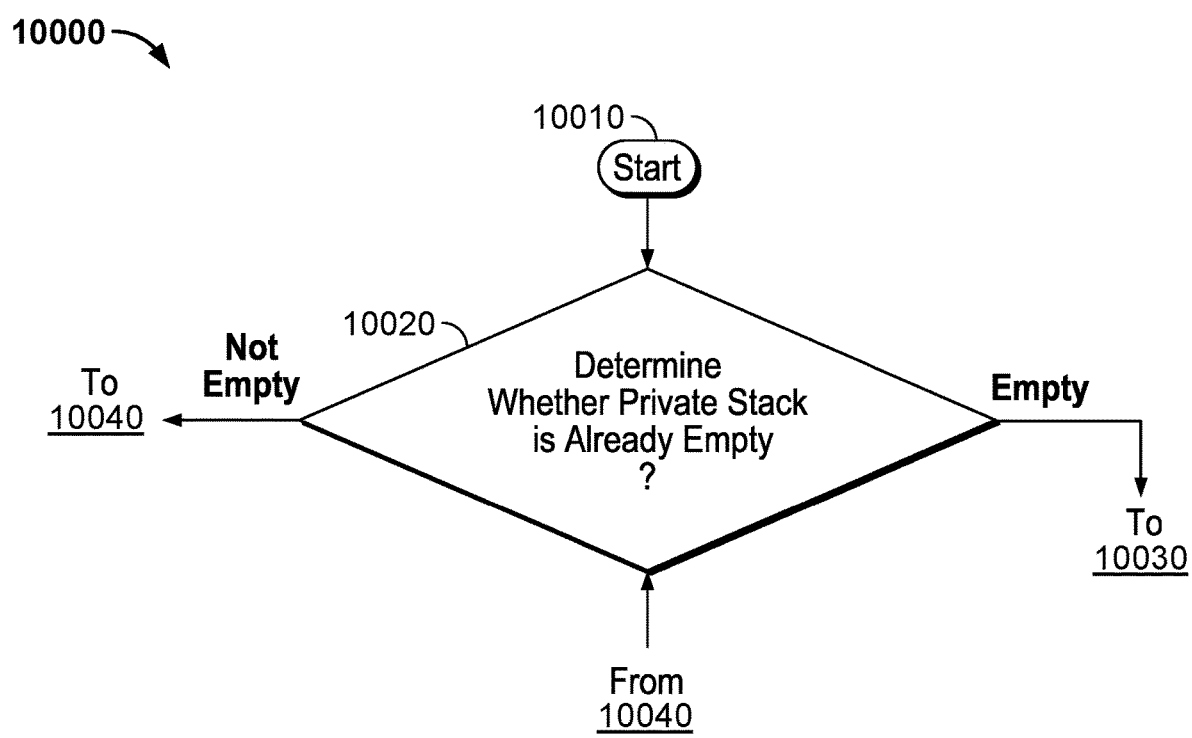
FIG. 10 is a sixth flowchart of the example of the process for mark processing.
Figure 10:
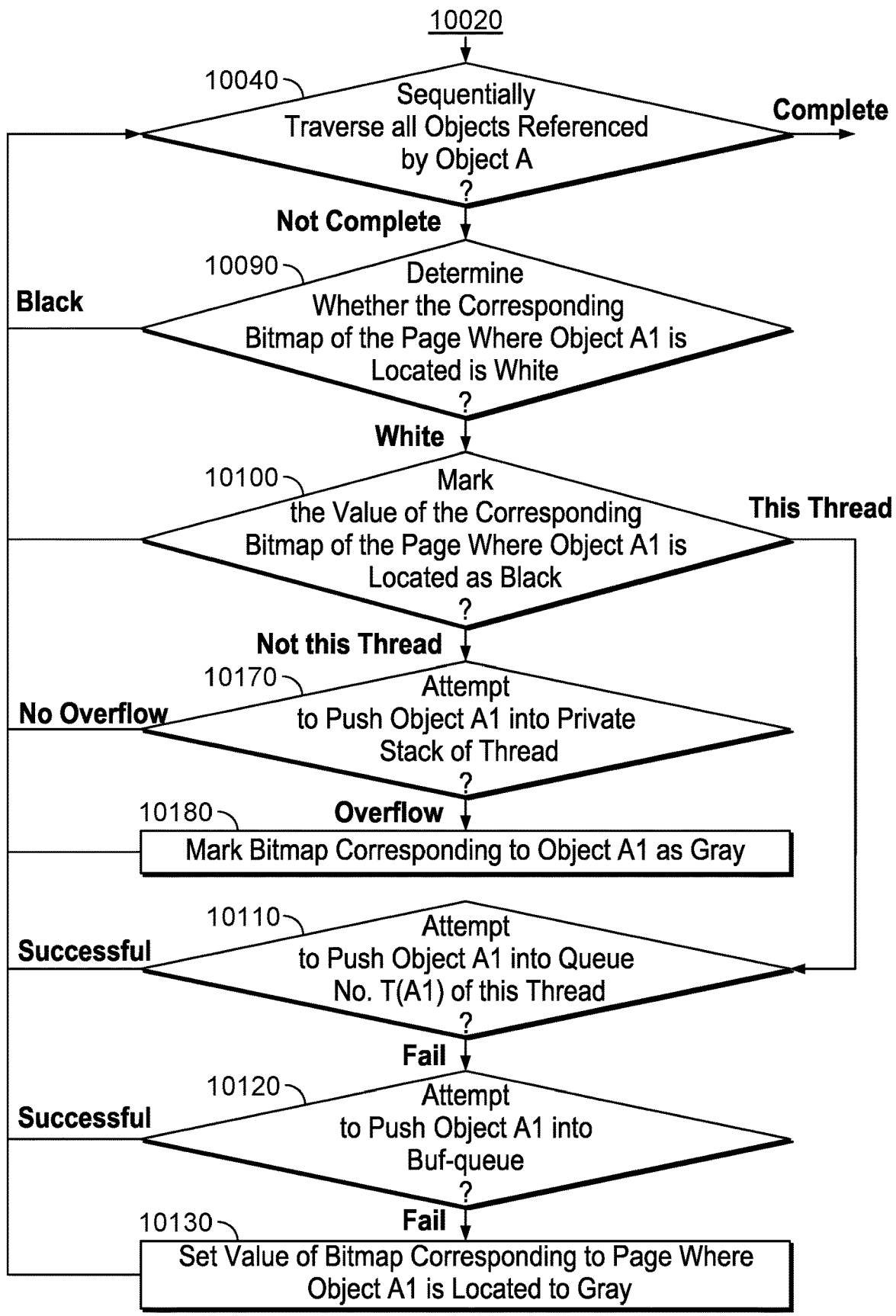
Figure 10:
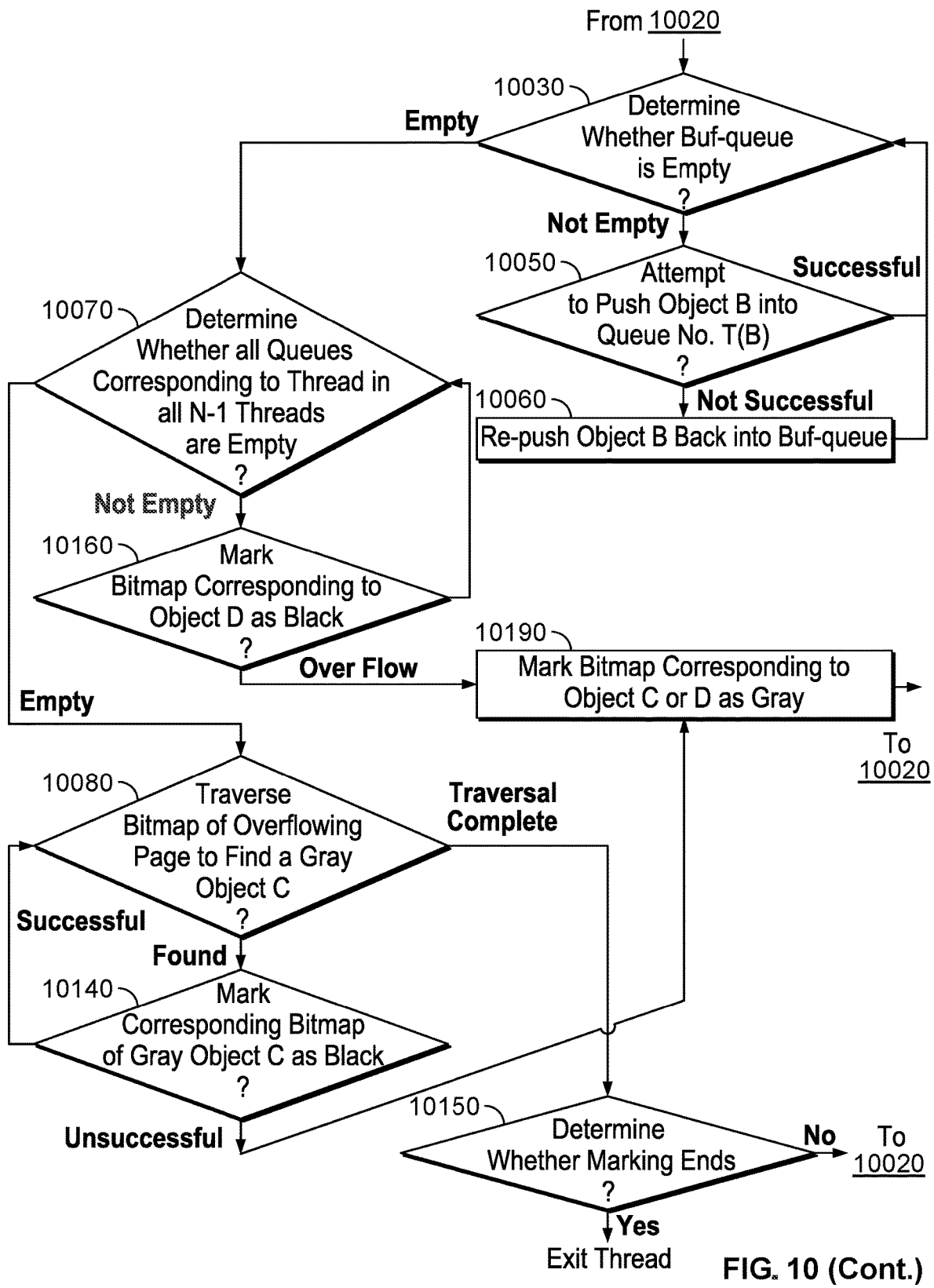

FIG. 10 is a sixth flowchart of the example of the process for mark processing. In some embodiments, the process 10000 is a color marking approach employing memory block bitmaps to subject the push-in conditions of the second through fifth objects to mark processing, is implemented by the first marking thread, and comprises:

In the event that the pointer of the currently processed object was pushed into a corresponding target space (private stack, buffer queue or Queue-x), the corresponding position in the memory block bitmap where the current object is located undergoes a black marking process. The target space can be one of at least three cases: a current marking thread's private stack, a buffer queue if the private stack has overflowed, or common output queue-i if the object's owner memory block is responded by marking thread-i.

In the event that the pointer of the currently processed object was not pushed into a corresponding target space, the corresponding position in the memory block bitmap where the current object is located undergoes gray mark processing.

In the event that the corresponding position in the memory block bitmap where the current object is marked white, the object has not been processed.

Please understand that subjecting the corresponding position in the memory block bitmap where the current object is located to color mark processing based on different push-in conditions with regard to the corresponding target space of the processed object is illustrative and can be adjusted according to specific application need.

Based on the approach described above, let A be the first object, let A1 be the second object, let B be the third object, let D be the fourth object, and let C be the fifth object. Note that object A references objects B and A1. The approach is explained with the example below:

As shown in FIG. 10, the process 10000 includes:

In 10010, the thread starts.

In 10020, the first marking thread determines whether the private stack is empty.

In 10020, in the event that the private stack is already empty, control passes to operation 10030. Otherwise, pop out an object, e.g., A, and control passes to operation 10040.

In 10030, the first marking thread determines whether the buf-queue is empty.

In 10030, in the event that buf-queue is empty, control passes to operation 10070. Otherwise, the first marking thread traverses buf-queue, pops out an object, e.g., B, and control passes to operation 10050. In the event that buf-queue is already completely traversed, control passes to operation 10070.

In 10040, the first marking thread sequentially traverses all objects referenced by object A. After all of the objects references by object A have been traversed, control passes to operation 10020. Otherwise, traverse to, for example, object A1, and control passes to operation 10090.

In 10050, the first marking thread attempts to push object B, which was popped out in operation 10030, into queue no. T(B) in this thread. In the event that the push is successful, control passes to operation 10030. Otherwise, mark the page (memory block) where object B is located as overflowed, and control passes to operation 10060.

In 10060, the first marking thread re-pushes object B back into buf-queue. Please note that the re-push will not fail this time because object B was popped out from buf-queue.

In 10070, the first marking thread traverses the queues corresponding to this thread in the other N−1 threads, and removes marked objects. There is to be only one queue that is not empty to pop out a marked object, such as object D, and control passes to operation 10160. In the event that all the queues corresponding to this thread in all N−1 threads are empty, control passes to operation 10080.

In 10080, in the event that overflow is detected while traversing the pages for which this thread is responsible, the first marking thread traverses the bitmap of the overflowing page to find a gray object, e.g., C. In the event that the gray object is found, control passes to operation 10140. After completion of the traversal of the bitmap, the first marking thread cleans the overflow tags from the page, and control passes to operation 10150.

In 10090, the first marking thread determines whether the corresponding bitmap of the page where object A1 is located (and which was traversed in operation 10040) is white. In the event that the object A1 is black, control passes to operation 10040. In the event that the object A1 is white, control passes to operation 10100.

In 10100, the first marking thread marks the value of the corresponding bitmap of the page where object A1 is located as black. If T(A1) is this thread, control passes to operation 10170; otherwise, control passes to operation 10110.

In 10110, the first marking thread attempts to push object A1 into queue no. T(A1) of this thread. In the event that the push fails, then the first marking thread sets the page where A1 is located to overflow and control passes to operation 10120. In the event that the push is successful, control passes to operation 10040.

In 10120, the first marking thread attempts to push object A1 into buf-queue. In the event that the push is successful, control passes to operation 10040; otherwise, control passes to operation 10130.

In 10130, the first marking thread sets the value of the bitmap corresponding to the page where object A1 is located to gray and sets an overflow tag for the page.

In 10140, the first marking thread marks the corresponding bitmap of gray object C which was traversed in operation 10080 as black and pushes object C into the private stack. In the event that the push is successful, control passes to operation 10080. In the event that the push is unsuccessful, then set an overflow tag for the page where object C is located and control passes to operation 10190.

In 10150, in the event that the marking ends, the first marking thread exits the thread; otherwise, control passes to operation 10020 and the first marking thread continues parallel marking.

In 10160, the first marking thread marks the bitmap corresponding to object D as black, and attempts to push object D into the stack of this thread. In the event that the push is successful, control passes to operations 10070. In the event that the stack is overflowing as a result of the push, control passes to operations 10190.

In 10170, the first marking thread attempts to push object A1 into the private stack of this thread. In the event that the push succeeds, i.e., there is no overflow, and control passes to operations 10040; otherwise, control passes to operations 10180.

In 10180, the first marking thread marks the bitmap corresponding to object A1 as gray and sets an overflow tag for the page where A1 is located, and control passes to operations 10040.

In 10190, the first marking thread marks the bitmap corresponding to object D or C (can be from operation 10140 or 10160) as gray and sets an overflow tag for the page where the marked object is located, and control passes to operations 10020.

As an example, the particular processing operations described below relate to the processes 600 to 900 of FIGS. 6 through 9 in light of the operations of FIG. 10.

Figure 19A:
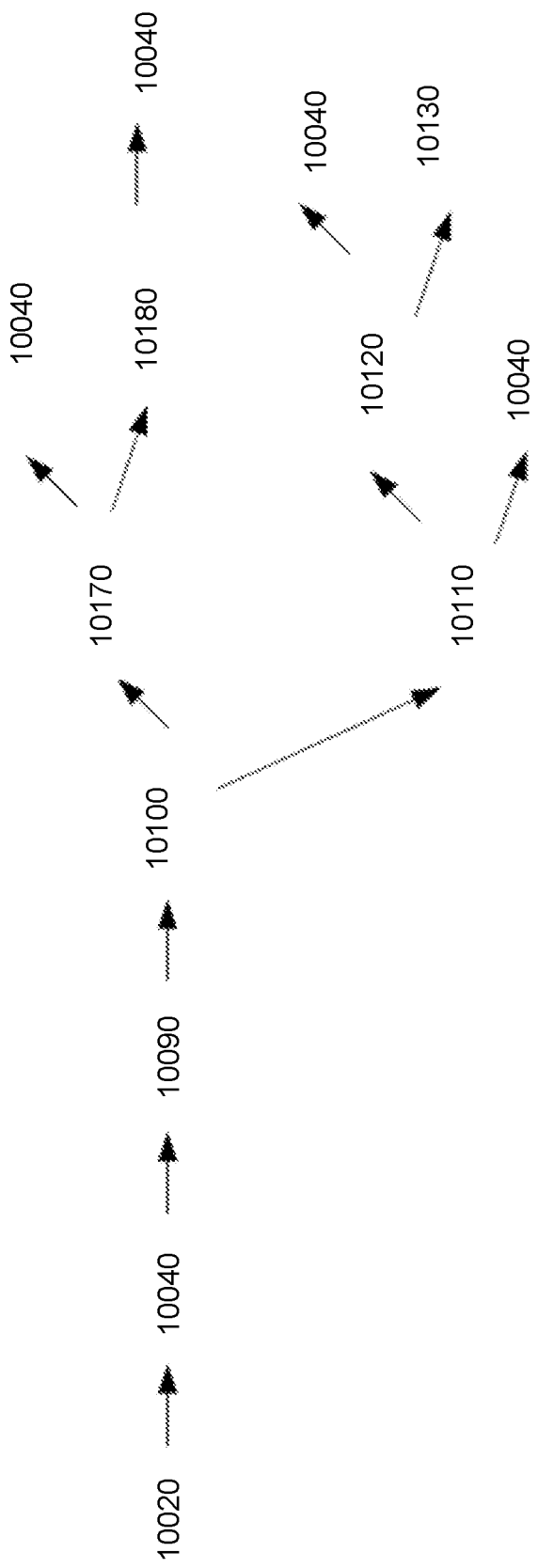
FIG. 19A is flowchart of an example of the process for mark processing.

FIG. 19A is flowchart of an example of the process for mark processing. Operation flowchart (1) of FIG. 19A relates to a portion of the process 10000 of FIG. 10.

Figure 19B:
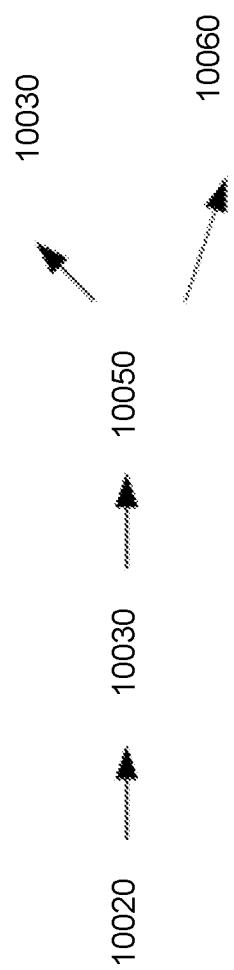
FIG. 19B is flowchart of another example of the process for mark processing.

FIG. 19B is flowchart of another example of the process for mark processing. Operation flowchart (2) of FIG. 19B relates to yet another portion of the process 10000 of FIG. 10.

Figure 19C:
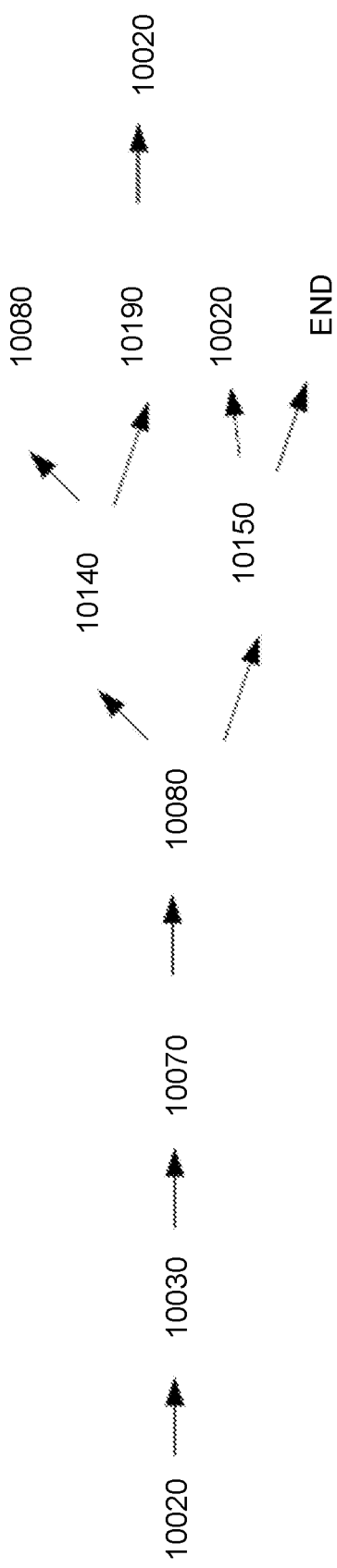
FIG. 19C is flowchart of yet another example of the process for mark processing.

FIG. 19C is flowchart of yet another example of the process for mark processing. Operation flowchart (3) of FIG. 19C relates to yet another portion of the process 10000 of FIG. 10.

Figure 19D:
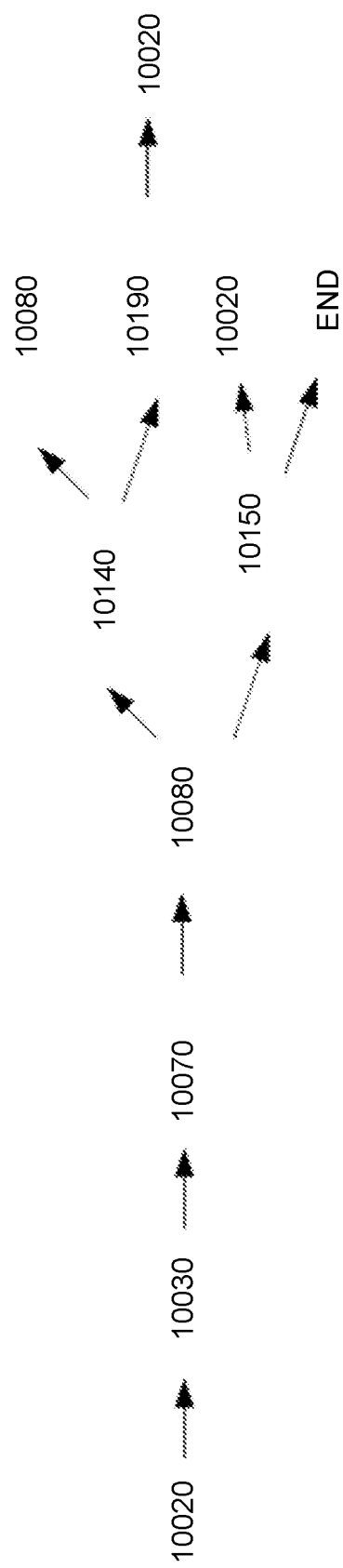
FIG. 19D is flowchart of yet another example of the process for mark processing.

FIG. 19D is flowchart of yet another example of the process for mark processing. Operation flowchart (4) of FIG. 19D relates to yet another portion of the process 10000 of FIG. 10.

Figure 11:
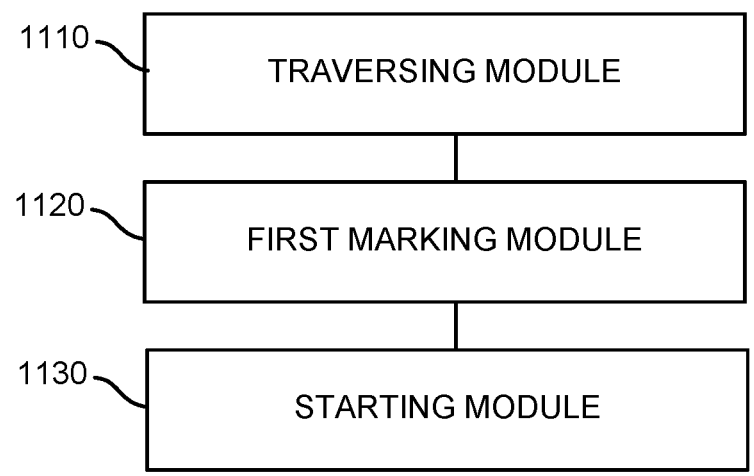
FIG. 11 is a structural diagram of an embodiment of a device for parallel mark processing.

FIG. 11 is a structural diagram of an embodiment of a device for parallel mark processing. In some embodiments, the device 1100 is configured to implement process 100 of FIG. 1 and comprises: a traversing module 1110, a first marking module 1120, and a starting module 1130.

In some embodiments, the traversing module 1110 is configured to traverse first objects in the virtual machine heap based on correspondences between memory blocks in a virtual machine heap and N marking threads. In some embodiments, N is an integer greater than 1, the memory capacity occupied by N marking threads is preset, and each marking thread includes: one private stack.

In some embodiments, the first marking module 1120 is configured to push a first pointer of the currently processed first object into a private stack of the marking thread corresponding to the memory block where the first object is located, and perform first mark processing of the first object based on the push-in condition of the first pointer.

In some embodiments, the starting module 1130 is configured to, after completing traversal of the first objects, send a thread start instruction to the N marking threads to cause the N marking threads, based on the push-in conditions of the first pointers in their respective private stacks, to synchronously perform mark processing used in garbage collection.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

With the device 1100 for parallel mark processing, the device traverses first objects in the virtual machine heap based on correspondences between memory blocks in a virtual machine heap and N marking threads. In some embodiments, the memory capacity occupied by N marking threads is preset. A first pointer of the currently processed first object is pushed into a private stack of the marking thread corresponding to the memory block where the first object is located, and first mark processing of the first object is performed according to the push-in condition of the first pointer. After completing traversal of the first objects, a thread start instruction is sent to the N marking threads to cause the N marking threads, based on the push-in conditions of the first pointers in their respective private stacks, to synchronously perform mark processing used in garbage collection. In this way, a limited amount of memory is used to implement parallel mark processing for multiple threads. The result is higher overall garbage collection performance.

Figure 12A:
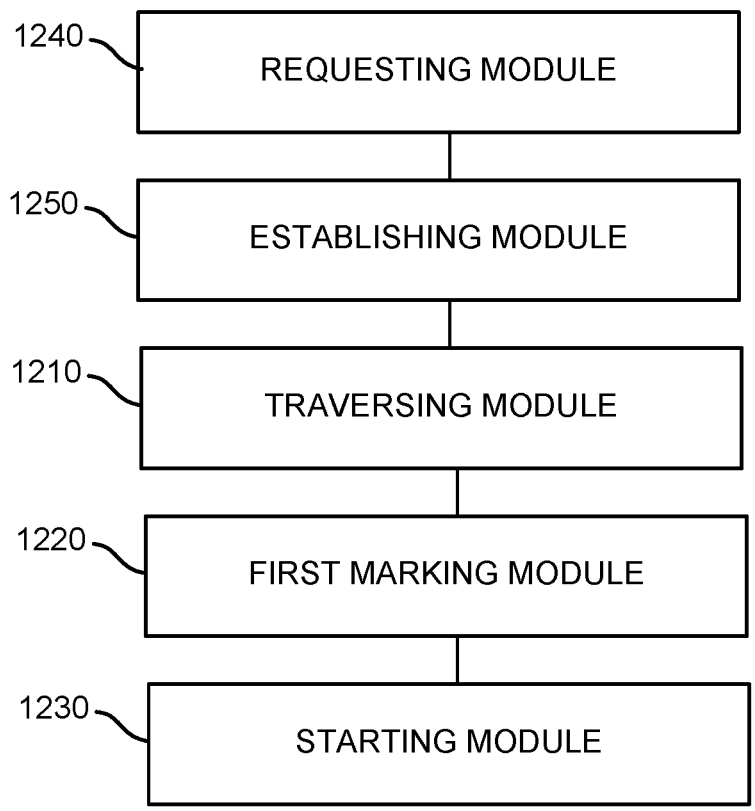
FIG. 12A is a structural diagram of another embodiment of a device for parallel mark processing.

FIG. 12A is a structural diagram of another embodiment of a device for parallel mark processing. In some embodiments, the device 1200 is configured to implement process 200 of FIG. 2 and comprises: a traversing module 1210, a first marking module 1220, a starting module 1230, a requesting module 1240, and an establishing module 1250.

The traversing module 1210, the first marking module 1220, and the starting module 1230 correspond with the traversing module 1110, the first marking module 1120, and the starting module 1130 of FIG. 11, respectively.

In some embodiments, the requesting module 1240 is configured to request the N marking threads.

In some embodiments, the establishing module 1250 is configured to establish correspondences between memory blocks in a virtual machine heap and N marking threads.

In some embodiments, the establishing module 1250 is configured to: designate a corresponding marking thread for each memory block, or designate memory blocks which each marking thread is responsible for marking.

Figure 12B:
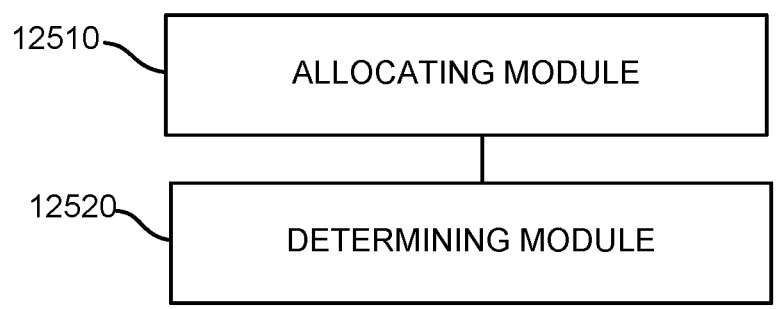
FIG. 12B is a structural diagram of an embodiment of an establishing module.

FIG. 12B is a structural diagram of an embodiment of an establishing module. In some embodiments, the establishing module 12500 corresponds to the establishing module 1250 of FIG. 12A and comprises: an allocating module 12510 and a determining module 12520.

In some embodiments, the allocating module 12510 is configured to traverse memory blocks in a virtual machine heap and allocate a number to each memory block.

In some embodiments, the determining module 12520 is configured to determine marking thread number corresponding to each memory block number based on the memory block numbers and the total quantity of marking threads N.

In some embodiments, the determining module 12520 is configured to acquire the remainder from dividing total marking threads N by the memory block number to determine the marking thread number corresponding to each memory block.

Referring back to FIG. 12A, the first marking module 1220 is configured to:

in the event that the first pointer was successfully pushed into the private stack of the marking thread corresponding to the memory block where the current first object is located, mark the status corresponding to the first object in the bitmap of the memory block where the current first object is located as pushed-in;

in the event that the first pointer failed to be pushed into the private stack of the marking thread corresponding to the memory block where the current first object is located, mark the status corresponding to the first object in the bitmap of the memory block where the current first object is located as overflowed.

Using the device 1200 for parallel mark processing, N marking threads are requested, all of the memory blocks of the virtual machine heap are traversed, and a number is allocated to each memory block. The memory block number and the total quantity of marking threads N are used to determine the marking thread number corresponding to each memory block number. Next, the first pointer of the currently processed first object is pushed into a private stack of the marking thread corresponding to the memory block where the first object is located. The first object undergoes first mark processing based on the push-in condition of the first pointer. After traversal of the first objects has been completed, a thread start instruction is sent to the N marking threads to cause the N marking threads, based on the push-in conditions of the first pointers in their respective private stacks, to synchronously perform mark processing used in garbage collection. In this way, limited memory is used to implement highly efficient parallel processing and implement, at the same time, load balancing of the marking threads. The result is increased garbage collection performance.

Figure 13:
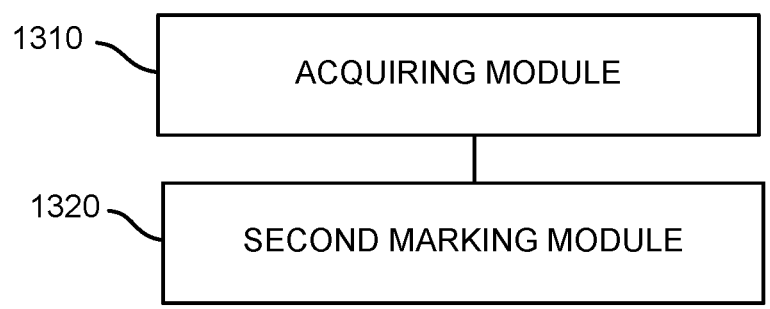
FIG. 13 is a structural diagram of yet another embodiment of a device for parallel mark processing.

FIG. 13 is a structural diagram of yet another embodiment of a device for parallel mark processing. In some embodiments, the device 1300 is configured to implement process 500 of FIG. 5 and comprises: an acquiring module 1310, and a second marking module 1320.

In some embodiments, there are N pre-requested marking threads and the memory capacity occupied by N marking threads, and the N marking threads comprise: Thread-1, Thread-2, . . . Thread-N.

Each of the N marking threads includes: one private stack. As a result of the processing described above, the first pointer of the first object (root object) that this thread is responsible for marking is stored within each private stack.

In some embodiments, the acquiring module 1310 is configured to remove from a first private stack the pre-pushed-in first pointer of the first object based on a thread start instruction.

In some embodiments, the second marking module 1320 is configured to traverse second objects, which are referenced by the first object and indicated by the first pointer, and subject the second objects to second mark processing based on correspondences between the preset N marking threads and memory blocks in a virtual machine heap.

Please understand that the process for parallel mark processing also apply to the device for parallel mark processing.

With the device 1300 for parallel mark processing, a first marking thread removes from the first private stack the pre-pushed-in first pointer of the first object based on a thread start instruction, and traverses a second object, which is referenced by the first object and indicated by a first pointer. Moreover, the second object is subjected to second mark processing based on correspondences between the preset N marking threads and memory blocks in a virtual machine heap. Thus, through parallel mark processing by N marking threads with reference to the mark processing process of the first marking thread, the device 1300 implements parallel mark processing using limited memory and increases overall garbage collection performance.

Figure 14A:
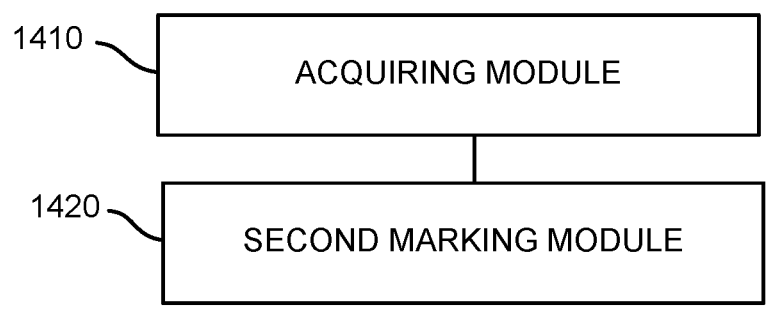
FIG. 14A is a structural diagram of yet another embodiment of a device for parallel mark processing.

FIG. 14A is a structural diagram of yet another embodiment of a device for parallel mark processing. In some embodiments, the device 1400 is configured to implement process 600 of FIGS. 6A and 6B and comprises: an acquiring module 1410, and a second marking module 1420.

In some embodiments, the acquiring module 1410 corresponds with the acquiring module 1310 of FIG. 13.

Figure 14B:
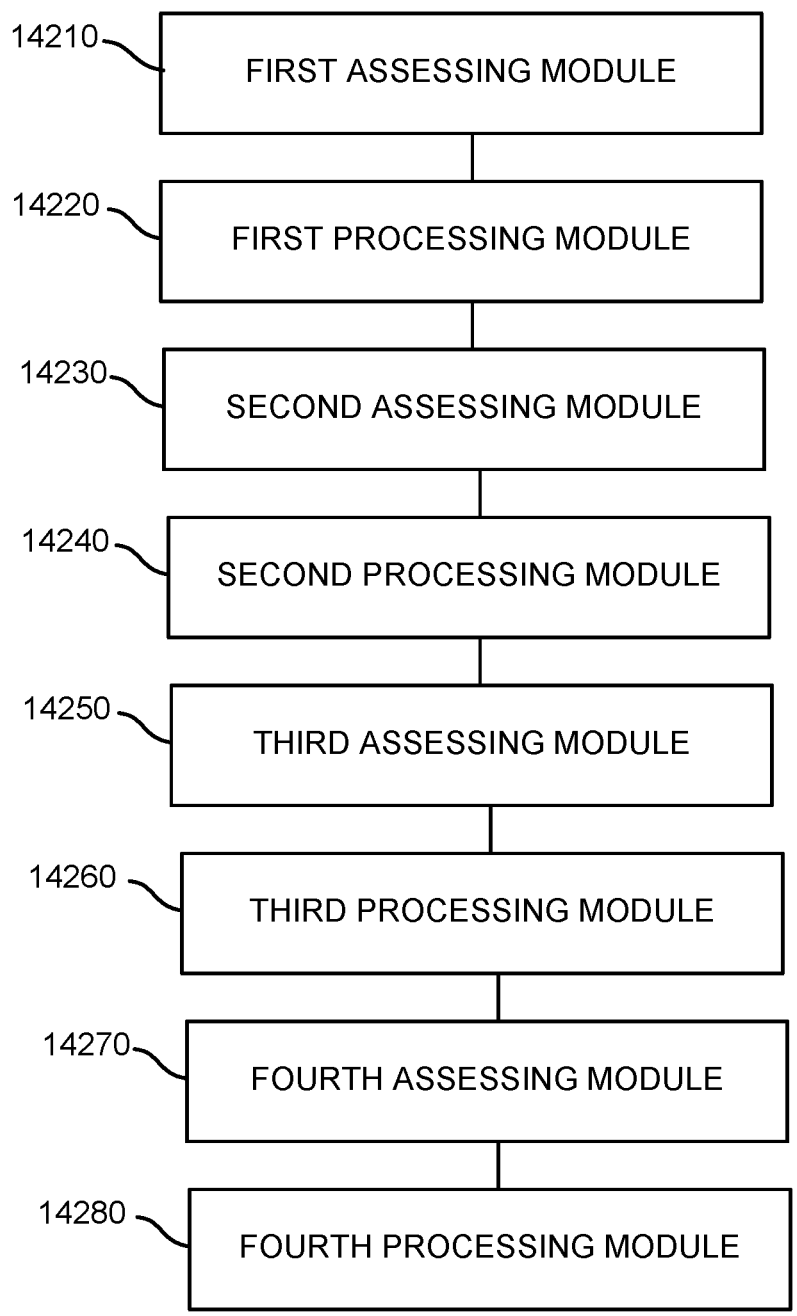
FIG. 14B is a structural diagram of an embodiment of a second marking module.

FIG. 14B is a structural diagram of an embodiment of a second marking module. In some embodiments, the establishing module 14200 corresponds to the second marking module 1420 of FIG. 14A and comprises: a first assessing module 14210, a first processing module 14220, a second assessing module 14230, a second processing module 14240, a third assessing module 14250, a third processing module 14260, a fourth assessing module 14270, and a fourth processing module 14280.

In some embodiments, the first assessing module 14210 is configured to determine, based on the correspondences, whether the first marking thread is responsible for performing mark processing on memory block P1 where the currently processed second object is located.

In some embodiments, the first processing module 14220 is configured to push the second pointer of the currently processed second object into the first private stack in the event that the first marking thread is responsible for mark processing of the memory block P1.

In some embodiments, the second assessing module 14230 is configured to determine whether the second pointer was successfully pushed into the first private stack.

In some embodiments, the second processing module 14240 is configured to mark the status corresponding to the second object in the bitmap of the memory block P1 as overflowed in the event that the first marking thread failed to push the second pointer into the private stack.

In some embodiments, the second processing module 14240 is further configured to set an overflow tag corresponding to the memory block P1.

In some embodiments, the second processing module 14240 is further configured to continue processing the next second object corresponding to the first pointer in the event that the first marking thread succeeded in pushing the second pointer into the first private stack.

In some embodiments, the first processing module 14220 is further configured to determine, whether the first marking thread is not responsible for mark processing of the memory block P1, that marking thread M is responsible for mark processing of the memory block P1 and push the second pointer into common output queue M corresponding to the marking thread M in the first marking thread.

In some embodiments, the third assessing module 14250 is configured to determine whether the second pointer was successfully pushed into the common output queue M.

In some embodiments, the third processing module 14260 is configured to continue processing on the next second object corresponding to the first pointer in the event that the first marking thread succeeded in pushing the second pointer into the common output queue M.

In some embodiments, the third processing module 14260 is further configured to push the second pointer into the first buffer queue in the first marking thread in the event that the first marking thread failed to push the second pointer into the common output queue M.

In some embodiments, the fourth assessing module 14270 is configured to determine whether the second pointer was successfully pushed into the first buffer queue.

In some embodiments, the fourth processing module 14280 is configured to mark the status corresponding to the currently processed second object in the bitmap of the memory block P1 as overflowed in the event that the first marking thread failed to push the second pointer into the first buffer queue.

In some embodiments, the fourth processing module 14280 is further configured to set an overflow tag corresponding to the memory block P1.

In some embodiments, the fourth processing module 14280 is further configured to continue processing on the next second object corresponding to the first pointer in the event that the first marking thread succeeded in pushing the second pointer into the first buffer queue.

In some embodiments, the fourth processing module 14280 is further configured to query the status mark corresponding to the second object in the bitmap of the memory block P1, and in the event that the status mark corresponding to the second object is "unmarked," change the status corresponding to the second object to pushed-in.

With the device 1400 for parallel mark processing, a first marking thread removes from the first private stack the pre-pushed-in first pointer of the first object based on a thread start instruction, and traverses a second object, which is referenced by the first object and indicated by the first pointer. Moreover, the second object is subjected to second mark processing based on correspondences between the preset N marking threads and memory blocks in a virtual machine heap. Thus, through parallel mark processing by N marking threads with reference to the mark processing process of the first marking thread, the device implements highly efficient parallel marking using limited memory, simultaneously implements load balancing of marking threads, and thus reduces CPU cache coherence conflicts and increases overall garbage collection performance.

Figure 15A:
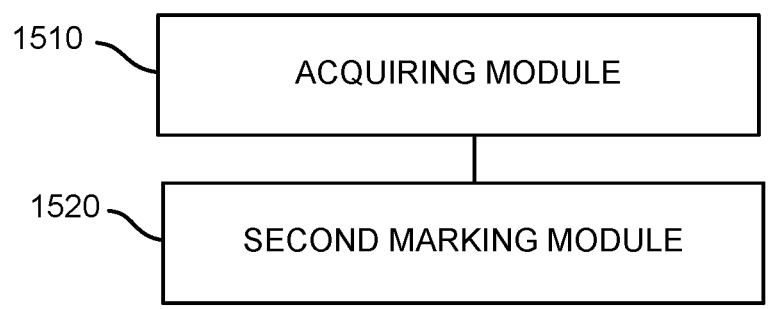
FIG. 15A is a structural diagram of yet another embodiment of a device for parallel mark processing.

FIG. 15A is a structural diagram of yet another embodiment of a device for parallel mark processing. In some embodiments, the device 1500 is configured to implement the process 700 of FIG. 7, and comprises: an acquiring module 1510 and a second marking module 1520.

In some embodiments, the acquiring module 1510 corresponds with the acquiring module 1310 of FIG. 13.

Each of the N preset marking threads also includes: one buffer queue and N−1 common output queues corresponding to the other N−1 marking threads.

Figure 15B:
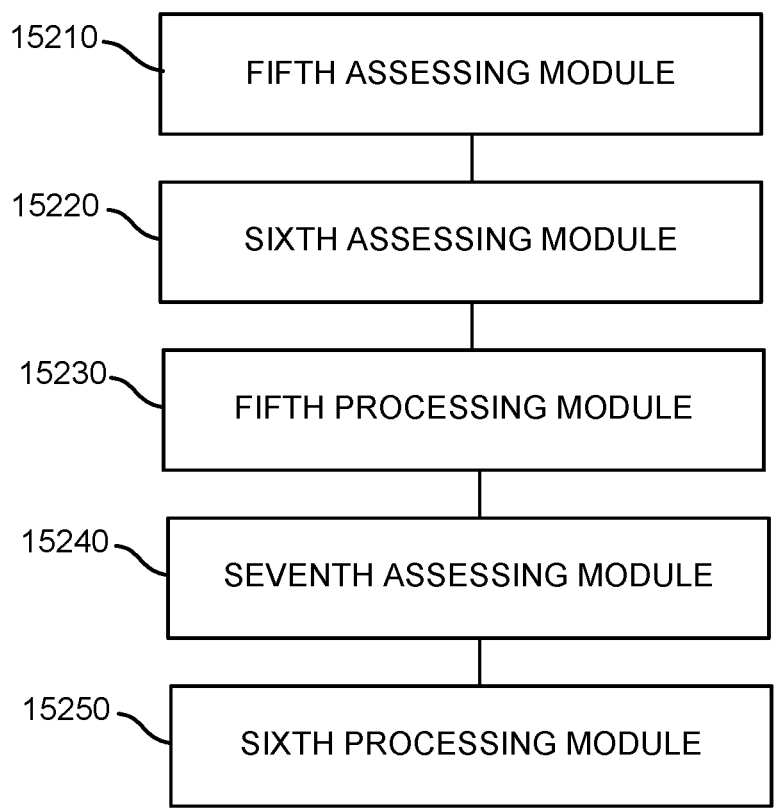
FIG. 15B is a structural diagram of another embodiment of a second marking module.

FIG. 15B is a structural diagram of another embodiment of a second marking module. In some embodiments, the second marking module 15200 corresponds to the second marking module 1520 of FIG. 15A and comprises: a fifth assessing module 15210, a sixth assessing module 15220, a fifth processing module 15230, a seventh assessing module 15240, and a sixth processing module 15250.

In some embodiments, the fifth assessing module 15210 is configured to determine whether the first private stack is empty.

In some embodiments, the sixth assessing module 15220 is configured to determine whether the first buffer queue of the first marking thread is empty in the event that the first private stack is empty.

In some embodiments, the fifth processing module 15230 is configured to in the event that the first buffer queue is not empty, the first marking thread removes from the first buffer queue the pre-pushed-in third pointer of the third object. In some embodiments, the first marking thread is not responsible for mark processing of memory block P2 where the currently processed third object is located, determines, based on correspondences, that marking thread W is responsible for mark processing of memory block P2 where the currently processed third object is located, and pushes the third pointer into common output queue W corresponding to the marking thread W in the first marking thread.

In some embodiments, the seventh assessing module 15240 is configured to determine whether the currently processed third pointer was successfully pushed into the common output queue W.

In some embodiments, the sixth processing module 15250 is configured to go to the next third object in the first buffer queue and continue push-in processing directed at the corresponding common output queue in the event that first marking thread succeeded in pushing the third pointer into the common output queue W.

In some embodiments, the sixth processing module 15250 is configured to re-push the third pointer into the first buffer queue in the event that the first marking thread failed to push the third pointer into the common output queue W.

Using the device 1500 for parallel mark processing, in the event that the first private stack of the first marking thread is empty and the first buffer queue is not empty, the pre-pushed-in third pointer of the third object is removed from the first buffer queue. The common output queue is subjected to push-in processing of the corresponding marking thread in this thread so that the marking thread corresponding to the third object can perform mark processing on the third object. Thus, through coordinated, parallel mark processing performed by N marking threads with reference to the mark processing process of the first marking thread, the device implements highly efficient parallel marking using limited memory, simultaneously implements load balancing of marking threads, and thus reduces CPU cache coherence conflicts and increases overall garbage collection performance.

Figure 16A:
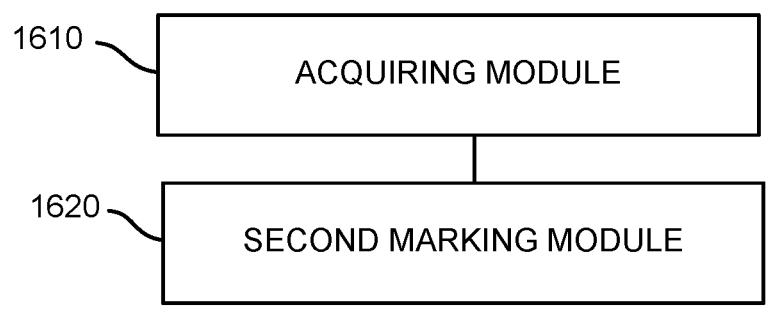
FIG. 16A is a structural diagram of yet another embodiment of a device for parallel mark processing.

FIG. 16A is a structural diagram of yet another embodiment of a device for parallel mark processing. In some embodiments, the device 1600 is configured to implement the process 800 of FIG. 8, and comprises: an acquiring module 1610 and a second marking module 1620.

In some embodiments, the acquiring module 1610 corresponds with the acquiring module 1310 of FIG. 13.

Figure 16B:
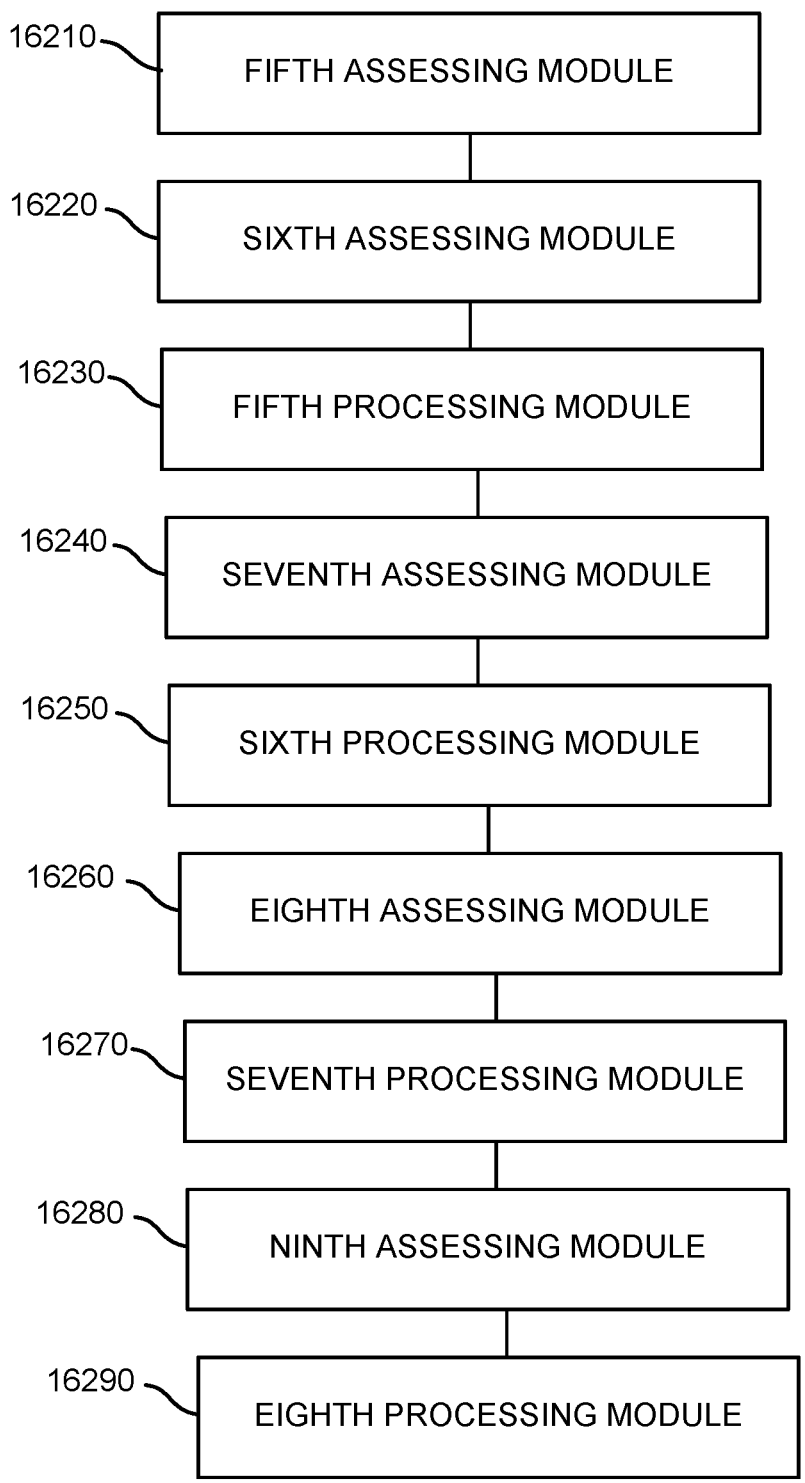
FIG. 16B is a structural diagram of yet another embodiment of a second marking module.

FIG. 16B is a structural diagram of yet another embodiment of a second marking module. In some embodiments, the second marking module 16200 corresponds to the second marking module 1620 of FIG. 16A and comprises: a fifth assessing module 16210, a sixth assessing module 16220, a fifth processing module 16230, a seventh assessing module 16240, a sixth processing module 16250, an eighth assessing module 16260, a seventh processing module 16270, a ninth assessing module 16280, and an eighth processing module 16290.

The fifth assessing module 16210, the sixth assessing module 16220, the fifth processing module 16230, the seventh assessing module 16240, and the sixth processing module 16250 corresponds with the fifth assessing module 15210, the sixth assessing module 15220, the fifth processing module 15230, the seventh assessing module 15240, and the sixth processing module 15250 of FIG. 15B, respectively.

In some embodiments, the eighth assessing module 16260 is configured to determine, in the event that the first buffer queue is empty, whether a common output queue corresponding to the first marking thread in the other N−1 marking threads is empty.

In some embodiments, the seventh processing module 16270 whereby, in the event that a common output queue corresponding to the first marking thread in the currently processed marking thread T is not empty, the marking thread removes from the currently processed common output queue the pre-pushed-in fourth pointer of the fourth object, and pushes the fourth pointer into the first private stack. In some embodiments, the fourth object was pushed in in advance by the marking thread T, and the first marking thread is responsible for mark processing of memory block P3 where the fourth object is located.

In some embodiments, the ninth assessing module 16280 is configured to determine whether the fourth pointer was successfully pushed into the first private stack.

In some embodiments, the eighth processing module 16290 is configured to mark the status corresponding to the fourth object in the bitmap of memory block P3 as overflowed in the event that the first marking unit failed to push the fourth pointer into the first private stack.

In some embodiments, the eighth processing module 16290 is further configured to set an overflow tag corresponding to the memory block P3.

In some embodiments, the eight processing module 16290 is further configured to go to the next fourth object and continue push-in processing directed at the private stack in the event that the first marking thread succeeded in pushing the fourth pointer into the private stack.

With the device 1600 for parallel mark processing, in the event that the first marking thread is empty in the first private stack and first buffer queue, and a common output queue corresponding to the first marking thread in other marking threads is not empty, the device removes the pre-pushed-in fourth pointer of the fourth object and performs push-in processing on the first private stack in this thread. Thus, through coordinated, parallel mark processing performed by N marking threads with reference to the mark processing process of the first marking thread, the device implements highly efficient parallel marking using limited memory, simultaneously implements load balancing of marking threads, and thus reduces CPU cache coherence conflicts and increases overall garbage collection performance.

Figure 17A:
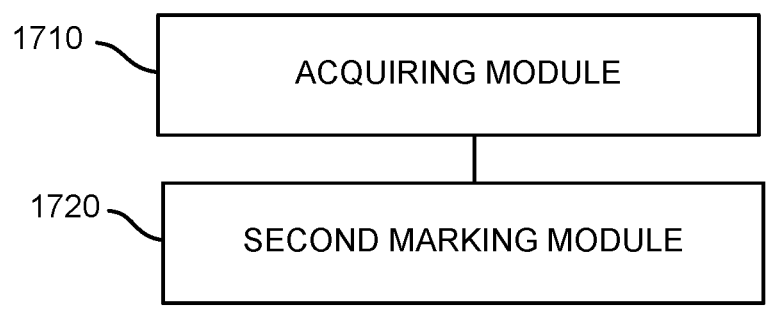
FIG. 17A is a structural diagram of yet another embodiment of a device for parallel mark processing.

FIG. 17A is a structural diagram of yet another embodiment of a device for parallel mark processing. In some embodiments, the device 1700 is configured to implement the process 900 of FIG. 9, and comprises: an acquiring module 1710 and a second marking module 1720.

In some embodiments, the acquiring module 1710 corresponds with the acquiring module 1310 of FIG. 13.

Figure 17B:
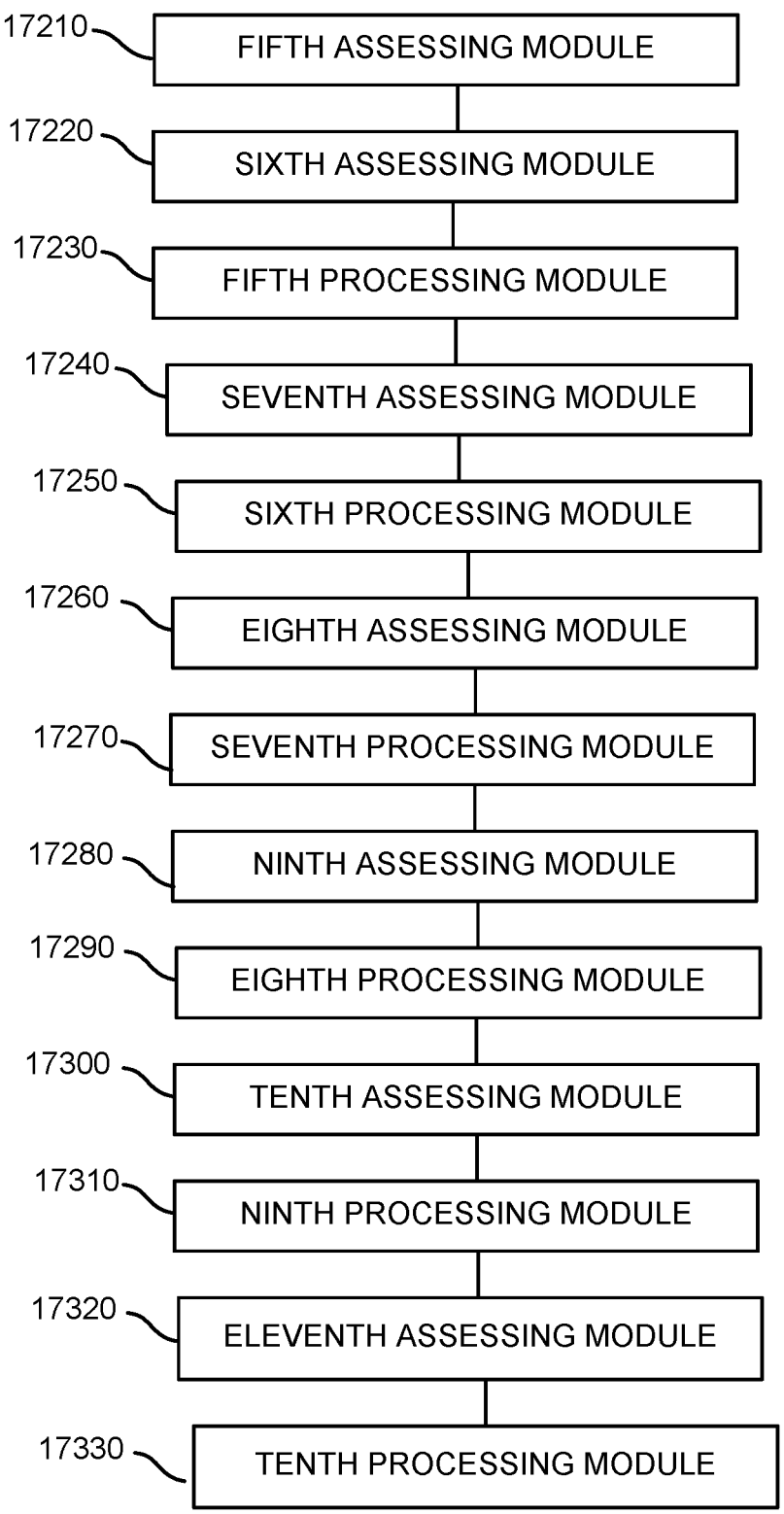
FIG. 17B is a structural diagram of yet another embodiment of a second marking module.

FIG. 17B is a structural diagram of yet another embodiment of a second marking module. In some embodiments, the second marking module 17200 corresponds to the second marking module 1720 of FIG. 17A and comprises: a fifth assessing module 17210, a sixth assessing module 17220, a fifth processing module 17230, a seventh assessing module 17240, a sixth processing module 17250, an eighth assessing module 17260, a seventh processing module 17270, a ninth assessing module 17280, an eighth processing module 17290, a tenth assessing module 17300, a ninth processing module 17310, an eleventh assessing module 17320 and a tenth processing module 17330.

The fifth assessing module 17210, the sixth assessing module 17220, the fifth processing module 17230, the seventh assessing module 17240, the sixth processing module 17250, the eighth assessing module 17260, the seventh processing module 17270, the ninth assessing module 17280, and the eighth processing module 17290 corresponds with the fifth assessing module 16210, the sixth assessing module 16220, the fifth processing module 16230, the seventh assessing module 16240, the sixth processing module 16250, the eighth assessing module 16260, the seventh processing module 16270, the ninth assessing module 16280, and the eighth processing module 16290 of FIG. 16B, respectively.

In some embodiments, the tenth assessing module 17300, whereby, in the event that all the common output queues corresponding to the first marking thread in the N−1 other marking threads are empty, the first marking thread determines whether the memory block that the first marking thread itself is responsible for marking has a fifth object with overflowed status.

In some embodiments, the ninth processing module 17310, whereby, in the event that the memory block whose marking is the responsibility of the first marking thread does have a fifth object with overflowed status, the first marking thread changes the fifth object marked with overflowed status in currently processed memory block P4 to pushed-in status and pushes the fifth pointer of the fifth object into the first private stack.

In some embodiments, the eleventh assessing module 17320 is configured to determine whether the first marking thread successfully pushed the fifth pointer into the first private stack.

In some embodiments, the tenth processing module 17330, for marking the status corresponding to the fifth object in the bitmap of the memory block P4 as overflowed in the event that the first marking thread failed to push the fifth pointer into the first private stack.

In some embodiments, the tenth processing module 17330 is further configured to set an overflow tag corresponding to the memory block P5.

In some embodiments, the tenth processing module 17330 is further configured to continue processing on the next fifth object.

In some embodiments, the ninth processing module 17310 is configured to end marking and exit from the thread in the event that the memory block whose marking is the responsibility of the first marking thread does not have a fifth object with overflowed status.

With the device 1700 for parallel mark processing, in the event that the first marking thread is empty in the first private stack, the first buffer queue, and the common output queue corresponding to the first marking thread in the other marking thread threads, push-in processing is performed based on the fifth object with overflowed status that this thread is responsible for marking. Thus, through parallel mark processing by N marking threads with reference to the mark processing process of the first marking thread, the device implements highly efficient parallel marking using limited memory and increases overall garbage collection performance.

Figure 18:
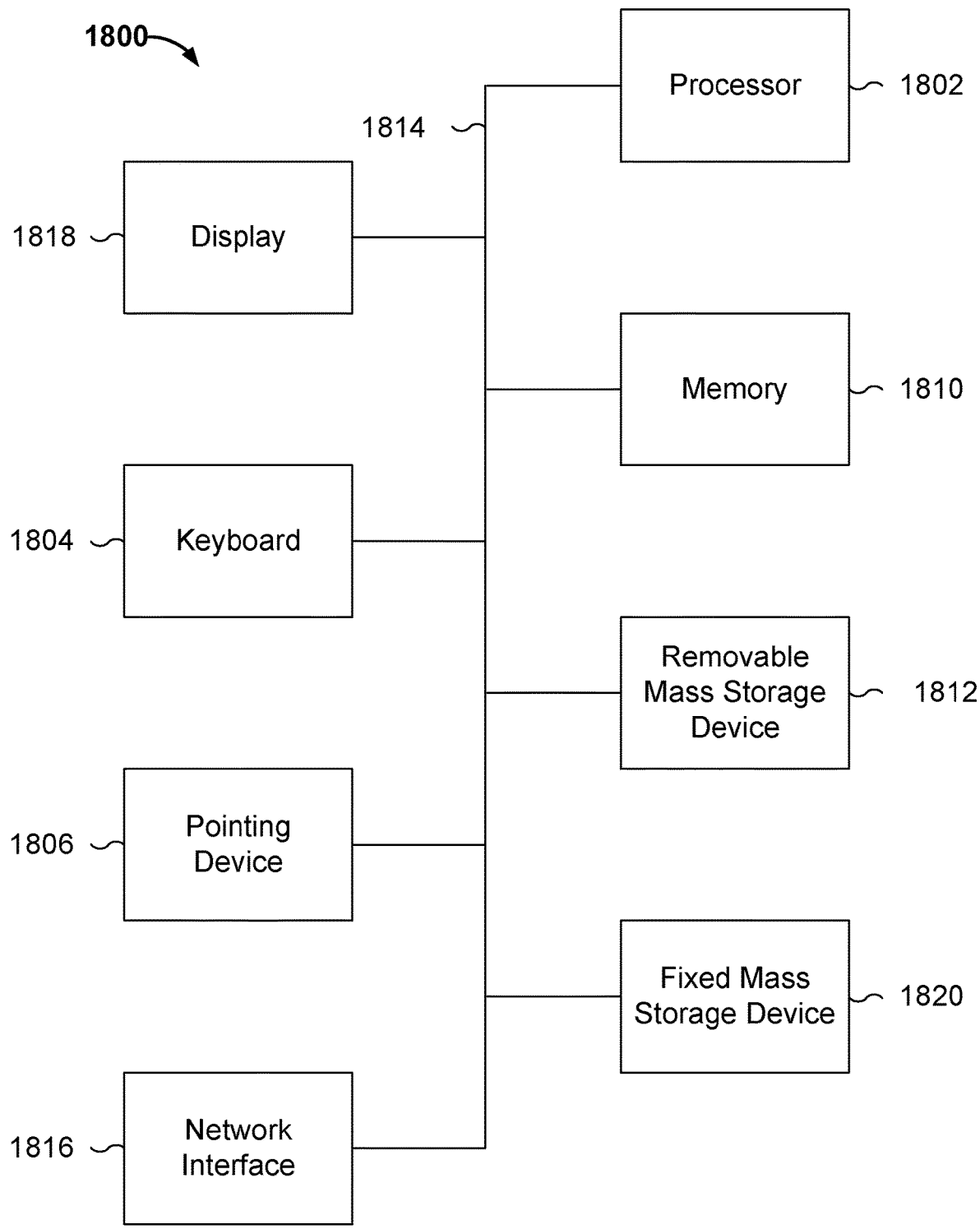
FIG. 18 is a functional diagram illustrating a programmed computer system for performing parallel mark processing in accordance with some embodiments.

FIG. 18 is a functional diagram illustrating a programmed computer system for performing parallel mark processing in accordance with some embodiments. As will be apparent, other computer system architectures and configurations can be used to perform parallel mark processing. Computer system 1800, which includes various subsystems as described below, includes at least one microprocessor subsystem (also referred to as a processor or a central processing unit (CPU)) 1802. For example, processor 1802 can be implemented by a single-chip processor or by multiple processors. In some embodiments, processor 1802 is a general purpose digital processor that controls the operation of the computer system 1800. Using instructions retrieved from memory 1810, the processor 1802 controls the reception and manipulation of input data, and the output and display of data on output devices (e.g., display 1818).

Processor 1802 is coupled bi-directionally with memory 1810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1802. Also as is well known in the art, primary storage typically includes basic operating instructions, program code, data and objects used by the processor 1802 to perform its functions (e.g., programmed instructions). For example, memory 1810 can include any suitable computer-readable storage media, described below, depending on whether, for example, data access needs to be bi-directional or uni-directional. For example, processor 1802 can also directly and very rapidly retrieve and store frequently needed data in a cache memory (not shown).

A removable mass storage device 1812 provides additional data storage capacity for the computer system 1800, and is coupled either bi-directionally (read/write) or uni-directionally (read only) to processor 1802. For example, storage 1812 can also include computer-readable media such as magnetic tape, flash memory, PC-CARDS, portable mass storage devices, holographic storage devices, and other storage devices. A fixed mass storage 1820 can also, for example, provide additional data storage capacity. The most common example of mass storage 1820 is a hard disk drive. Mass storages 1812, 1820 generally store additional programming instructions, data, and the like that typically are not in active use by the processor 1802. It will be appreciated that the information retained within mass storages 1812 and 1820 can be incorporated, if needed, in standard fashion as part of memory 1810 (e.g., RAM) as virtual memory.

In addition to providing processor 1802 access to storage subsystems, bus 1814 can also be used to provide access to other subsystems and devices. As shown, these can include a display monitor 1818, a network interface 1816, a keyboard 1804, and a pointing device 1806, as well as an auxiliary input/output device interface, a sound card, speakers, and other subsystems as needed. For example, the pointing device 1806 can be a mouse, stylus, track ball, or tablet, and is useful for interacting with a graphical user interface.

The network interface 1816 allows processor 1802 to be coupled to another computer, computer network, or telecommunications network using a network connection as shown. For example, through the network interface 1816, the processor 1802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1802 can be used to connect the computer system 1800 to an external network and transfer data according to standard protocols. For example, various process embodiments disclosed herein can be executed on processor 1802, or can be performed across a network such as the Internet, intranet networks, or local area networks, in conjunction with a remote processor that shares a portion of the processing. Additional mass storage devices (not shown) can also be connected to processor 1802 through network interface 1816.

An auxiliary I/O device interface (not shown) can be used in conjunction with computer system 1800. The auxiliary I/O device interface can include general and customized interfaces that allow the processor 1802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 18 is but an example of a computer system suitable for use with the various embodiments disclosed herein. Other computer systems suitable for such use can include additional or fewer subsystems. In addition, bus 1814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    traversing first objects in a virtual machine heap based on correspondences between memory blocks in the virtual machine heap and N marking threads, wherein N is an integer greater than 1, wherein memory capacity occupied by the N marking threads is preset, wherein each marking thread includes a corresponding private stack, and wherein the memory capacity includes a thread memory capacity of N private stacks;
    pushing a first pointer of a first object of the first objects into a private stack of a marking thread corresponding to a memory block, the first object being located in the memory block, comprising:
        determining whether the private stack of the marking thread is full;
        in response to a determination that the private stack of the marking thread is full:
            marking the private stack as overflowing; and
            marking the first object as having an overflowed status for a push-in condition; and
        performing one or more of the following:
            recording, in a list form, the push-in condition of the first object corresponding to the private stack of the marking thread; and/or
            marking a status corresponding to the first object in a bitmap of the memory block where a current first object is located;
    performing first mark processing of the first object based on the push-in condition of the first pointer, comprising:
        determining whether the private stack is overflowing; and
        in response to a determination that the private stack is overflowing, omitting to perform the first mark processing of the first object until the private stack has new processing space;
    after traversal of the first objects has been completed, launching the N marking threads to cause the N marking threads to synchronously perform mark processing used in garbage collection based on push-in conditions of first pointers in respective private stacks of the first pointers.

2. The method as described in claim 1, prior to the traversing of the first objects in the virtual machine heap, the method further comprises:
    requesting the N marking threads;
    traversing the memory blocks in the virtual machine heap; and
    establishing the correspondences between the memory blocks in the virtual machine heap and the N marking threads.

3. The method as described in claim 2, wherein the establishing of the correspondences between the memory blocks in the virtual machine heap and the N marking threads comprises:
performing one of the following:
designating a corresponding marking thread for at least one memory block; or
designating at least one memory block which at least one marking thread is responsible for marking.

4. The method as described in claim 3, wherein the establishing of the correspondences between the memory blocks in the virtual machine heap and the N marking threads comprises:
allocating an identifier to a first memory block; and
determining a marking thread identifier corresponding to a first memory block number based on first memory block numbers and a total quantity of the N marking threads.

5. The method as described in claim 4, wherein the determining of the marking thread identifier corresponding to the first memory block number comprises:
acquiring a remainder from dividing the total quantity of the N marking threads by the first memory block identifier to determine a marking thread identifier corresponding to the at least one memory block.

6. The method as described in claim 1, wherein the performing of the first mark processing of the first object based on the push-in condition of the first pointer comprises:
in response to a determination that the first pointer was successfully pushed into the private stack of the marking thread corresponding to the memory block where the current first object is located, marking a status corresponding to the first object in a bitmap of the memory block where the current first object is located as pushed-in.

7. A system, comprising:
a processor; and
a memory coupled with the processor, wherein the memory is configured to provide the processor with instructions which when executed cause the processor to:
traverse first objects in a virtual machine heap based on correspondences between memory blocks in the virtual machine heap and N marking threads, wherein N is an integer greater than 1, wherein memory capacity occupied by the N marking threads is preset, wherein each marking thread includes a corresponding private stack, and wherein the memory capacity includes a thread memory capacity of N private stacks;
push a first pointer of a first object of the first objects into a private stack of a marking thread corresponding to a memory block, the first object being located in the memory block, comprising to:
determine whether the private stack of the marking thread is full;
in response to a determination that the private stack of the marking thread is full:
mark the private stack as overflowing; and
mark the first object as having an overflowed status for a push-in condition; and
perform one or more of the following:
record, in a list form, the push-in condition of the first object corresponding to the private stack of the marking thread; and/or
mark a status corresponding to the first object in a bitmap of the memory block where a current first object is located;
perform first mark processing of the first object based on the push-in condition of the first pointer, comprising to:
determine whether the private stack is overflowing; and
in response to a determination that the private stack is overflowing, omit performing the first mark processing of the first object until the private stack has new processing space; and
after traversal of the first objects has been completed, launching the N marking threads to cause the N marking threads to synchronously perform mark processing used in garbage collection based on push-in conditions of first pointers in respective private stacks of the first pointers.

* * * * *